US012659213B2

(12) United States Patent
Hanson et al.

(10) Patent No.: US 12,659,213 B2
(45) Date of Patent: Jun. 16, 2026

(54) TIME ALIGNING IN A DISTRIBUTED ANTENNA SYSTEM DOWNLINK DATA ORIGINATING FROM TWO DIFFERENT TYPES OF DONOR BASE STATIONS

(71) Applicant: Outdoor Wireless Networks LLC, Richardson, TX (US)

(72) Inventors: Van Erick Hanson, Forest, VA (US); Steven B. Stuart, Eden Prairie, MN (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 19/130,844

(22) PCT Filed: Dec. 19, 2023

(86) PCT No.: PCT/US2023/084836
§ 371 (c)(1),
(2) Date: May 16, 2025

(87) PCT Pub. No.: WO2024/137638
PCT Pub. Date: Jun. 27, 2024

(65) Prior Publication Data
US 2026/0012385 A1     Jan. 8, 2026

Related U.S. Application Data

(60) Provisional application No. 63/476,213, filed on Dec. 20, 2022.

(51) Int. Cl.
*H04L 27/26* (2006.01)
*H04L 5/00* (2006.01)

(52) U.S. Cl.
CPC ........ *H04L 27/2656* (2013.01); *H04L 5/0044* (2013.01)

(58) Field of Classification Search
CPC ... H04B 1/00; H04B 7/12; H04B 7/14; H04B 7/024; H04B 7/26; H04B 10/2575;
(Continued)

(56) References Cited

U.S. PATENT DOCUMENTS 8,855,036 B2    10/2014  Sabat et al.
9,897,638 B2     2/2018  Yeo et al.
(Continued)

FOREIGN PATENT DOCUMENTS

EP         2789107 B1      2/2017
WO     2024137638 A1      6/2024

OTHER PUBLICATIONS

International Searching Authority, "International Search Report and Written Opinion", dated Apr. 22, 2024, from PCT Application No. PCT/US2023/084836, pp. 1 through 9, Published: WO.

*Primary Examiner* — Shawkat M Ali
(74) *Attorney, Agent, or Firm* — Fogg & Powers LLC

(57) ABSTRACT

This invention relates to a DAS comprising a digital donor interface circuit, an RF donor interface circuit, a first DAS propagation path, a second DAS propagation path, and a radio unit and configured to obtain a first propagation time delay for the first DAS propagation path and a second propagation time delay for the second DAS propagation path, obtain at least one of a time delay of the RF donor interface circuit and the digital donor interface circuit, determine a first downlink time delay value, and transmit the first downlink time delay value to a delay adjustment circuit in a downlink path of the DAS.

17 Claims, 7 Drawing Sheets

(58) Field of Classification Search
CPC .. H04B 17/12; H04L 5/00; H04L 5/14; H04L
5/0044; H04L 27/2656; H04L 41/0823;
H04L 43/0852; H04W 4/00; H04W
24/04; H04W 72/04; H04W 72/12; H04W
76/16; H04W 88/08; H04W 88/10
USPC ........ 370/280, 281, 310, 312, 328; 375/219,
375/260, 262, 267, 295, 316
See application file for complete search history.

(56) References Cited

U.S. PATENT DOCUMENTS

| | | | |
|---|---|---|---|
| 2009/0180407 A1* | 7/2009 | Sabat .............. | H04B 10/25754 |
| | | | 370/280 |
| 2020/0382966 A1* | 12/2020 | Hanson .............. | H04B 7/15528 |
| 2021/0083759 A1 | 3/2021 | Hanson et al. | |
| 2022/0038126 A1 | 2/2022 | Kummetz et al. | |
| 2023/0354232 A1* | 11/2023 | Sriram .............. | H04W 56/0015 |

* cited by examiner

220

Obtain $t_{DAS1}$ and $t_{DAS2}$   220A

Obtain $t_{NRFD}$ and/or $t_{RFD}$   220B

Determine $t_{ONRF}$ and $t_{ORF}$   220C

Determine A First DL Time Delay   220D

Determine A First UL Time Delay   220E

Transmit The First DL Time Delay   220F

Transmit The First UL Time Delay to the Digital Interface Base Station   220G

TIME ALIGNING IN A DISTRIBUTED ANTENNA SYSTEM DOWNLINK DATA ORIGINATING FROM TWO DIFFERENT TYPES OF DONOR BASE STATIONS

CROSS-REFERENCE TO RELATED APPLICATIONS

The present application is a 371 National Stage Application of International Application No. PCT/US2023/084836, filed on Dec. 19, 2023, which claims the benefit of U.S. Patent Application Ser. No. 63/476,213, filed on Dec. 20, 2022; the entire contents of the aforementioned patent applications are incorporated herein by reference as if set forth in their entirety.

BACKGROUND

A distributed antenna system (DAS) typically includes one or more central units or nodes (also referred to here as "central access nodes (CANs)" or "master units") that are communicatively coupled to a plurality of remotely located radio or antenna units (also referred to here as "remote units"), where each radio unit can be coupled directly to one or more of the central access nodes or indirectly via one or more other radio units and/or via one or more intermediary or expansion units or nodes (also referred to here as "transport expansion nodes (TENs)"). A DAS is typically used to improve the coverage provided by one or more base stations that are coupled to the central access nodes. These base stations can be coupled to the one or more central access nodes via one or more cables or via a wireless connection, for example, using one or more donor antennas. The wireless service provided by the base stations can include commercial cellular service and/or private or public safety wireless communications.

In general, each central access node receives one or more downlink signals from one or more base stations and generates one or more downlink transport signals derived from one or more of the received downlink base station signals. Each central access node transmits one or more downlink transport signals to one or more of the radio units. Each radio unit receives the downlink transport signals transmitted to it from one or more central access nodes and uses the received downlink transport signals to generate one or more downlink radio frequency signals that are radiated from one or more coverage antennas associated with that radio unit. The downlink radio frequency signals are radiated for reception by user equipment (UEs). Typically, the downlink radio frequency signals associated with each base station are simulcasted from multiple radio units. In this way, the DAS increases the coverage area for the downlink capacity provided by the base stations.

Likewise, each radio unit receives one or more uplink radio frequency signals transmitted from the user equipment. Each radio unit generates one or more uplink transport signals derived from the one or more uplink radio frequency signals and transmits them to one or more of the central access nodes. Each central access node receives the respective uplink transport signals transmitted to it from one or more radio units and uses the received uplink transport signals to generate one or more uplink base station radio frequency signals that are provided to the one or more base stations associated with that central access node. Typically, this involves, among other things, summing uplink signals received from all of the multiple radio units in order to produce the base station signal provided to each base station.

In this way, the DAS increases the coverage area for the uplink capacity provided by the base stations.

A DAS can use either digital transport, analog transport, or combinations of digital and analog transport for generating and communicating the transport signals between the central access nodes, the radio units, and any transport expansion nodes.

When digital transport has traditionally been used in a DAS, the various nodes of a DAS have been coupled to each other using synchronous, point-to-point links and data has been transported in a time-domain form. The time-domain form of such data is also referred to here as using "option 8" for the functional split (for example, between a baseband unit (BBU) and remote radio head (RRH)) or simply "split 8." Approaches used with such split 8 implementations may have shortcomings when used in a DAS where the nodes are coupled to each other in other ways (for example, using a switched Ethernet network). Moreover, the O-RAN Alliance has developed an open, standardized fronthaul interface that is suitable for use in implementing distributed base station topologies using switched Ethernet networks as the fronthaul. ("O-RAN" is an acronym for "Open Radio Access Network.") The O-RAN fronthaul interface was designed primarily for use with user-plane data that is communicated in frequency-domain form. Communicating user-plane data in frequency-domain form reduces the amount of bandwidth used (relative to communicating data in time-domain form). The O-RAN fronthaul interface does support communicating data in time-domain form; however, doing so is bandwidth intensive.

Often a base station, and thus a DAS communicatively coupled to such a base station use time division duplexing (TDD). The base station, and thus the DAS, will use one of a number of TDD configurations specifying certain uplink and downlink periods with in a TDD period. To avoid interference, neighboring base stations, whether or not connected to the DAS, utilize the same TDD configuration. That is all radios are meant to transmit and receive during same time periods to avoid interference between two or more radios.

A DAS typically includes a radio frequency (RF) donor interface (or donor or donor interface circuit) configured to couple a RF-interface base station and at least one digital base band donor interface configured to couple a digital interface base station to a digital donor unit. Each digital interface base station and corresponding digital donor unit communicate using digital baseband data.

For pedagogical purposes, the DAS will be described as having one RF-interface base station, one digital interface base station, one RF donor, and one digital donor unit. The digital donor unit may also be referred to herein as a digital baseband donor interface. When using TDD, downlink signals of the RF-interface base station and the digital interface base station are time synchronized and commence radio frames at the same time at their respective antenna ports. In the case of the RF-interface base station, the antenna port is connected to the RF Donor, while the antenna port of the digital interface base station is the antenna port of the DAS remote unit.

The digital interface base station communicates with the DAS to determine propagation delay time to the antenna port of the radio unit. The digital interface base station advances transmission of frames of TDD data by such propagation delay time. The RF-interface base station is unable to do the foregoing. As a result, a radio frame of data from the RF-interface base station will arrive at a radio unit after a radio frame of data from the digital interface base station.

As a result, radio frames of data from the RF-interface base station can be wirelessly transmitted by the radio unit outside of a downlink period, and in an uplink period, of the TDD period from the digital interface base station. Such transmissions by the radio unit may desensitize neighboring radios using the same radio frame configuration. A desensitized neighboring radio may no longer be able to receive signals from user equipment in its planned coverage area.

SUMMARY

A distributed antenna system (DAS) serving a digital interface base station and a radio frequency (RF)-interface base station and configured to time align contemporaneous time division duplexing (TDD) frames from the digital interface base station and the RF-interface base station in a radio unit is provided. The distributed antenna system comprises: a digital donor interface circuit configured to couple the digital interface base station to the DAS and to communicate digital data in radio frames between the digital interface base station and the DAS; an RF donor interface circuit configured to couple the RF-interface base station to the DAS and to communicate data in radio frames in analog radio frequency (RF) signals between the RF-interface base station and the RF donor interface circuit; a first DAS propagation path; a second DAS propagation path; and the radio unit communicatively coupled to the digital donor interface circuit through the first DAS propagation path and communicatively coupled to the RF donor interface circuit through the second DAS propagation path, wherein the radio unit is configured to be coupled to a set of coverage antennas; wherein the DAS is configured to: obtain a first propagation time delay for the first DAS propagation path and a second propagation time delay for the second DAS propagation path; obtain at least one of a time delay of the RF donor interface circuit and the digital donor interface circuit; determine a first downlink time delay equal to (i) a largest propagation delay (a) between an antenna port of the radio unit and through the digital donor interface circuit or (b) between the antenna port of the radio unit and through the RF donor interface circuit, less (i) a shortest propagation time delay (x) between the antenna port of the radio unit and through the digital donor interface circuit or (y) between the antenna port of the radio unit and through the RF donor interface circuit; and transmit the first downlink time delay to a delay adjustment circuit in a downlink path of the DAS having the shortest propagation time delay (p) between the antenna port of the radio unit and through the digital donor interface circuit or (q) between the antenna port of the radio unit and through the RF donor interface circuit, wherein the delay adjustment circuit is configured to delay TDD downlink data in the downlink path by the first downlink time delay.

A method for time aligning, in a distributed antenna system (DAS), contemporaneous time division duplexing (TDD) frames from a digital interface base station and a radio frequency (RF)-interface base station in the DAS is provided. The method comprises: obtaining a first propagation time delay for a first DAS propagation path and a second propagation time delay for a second DAS propagation path; obtaining at least one of a time delay of an RF donor unit and a digital donor unit; determining a first downlink time delay equal to (i) a largest propagation delay (a) between an antenna port of a radio unit and through the digital donor unit or (b) between the antenna port of the radio unit and through the RF donor unit, less (i) a shortest propagation time delay (x) between the antenna port of the radio unit and through the digital donor unit or (y) between the antenna port of the radio unit and through the RF donor unit; and transmitting the first downlink time delay to a delay adjustment circuit in a downlink path of the DAS having the shortest propagation time delay (p) between the antenna port of the radio unit and through the digital donor unit or (q) between the antenna port of the radio unit and through the RF donor unit, wherein the delay adjustment circuit is configured to delay TDD downlink data in the downlink path by the first downlink time delay.

A non-transitory computer readable medium storing a program causing at least one processor to execute a process to time align, in a distributed antenna system (DAS), contemporaneous time division duplexing (TDD) frames from a digital interface base station and a radio frequency (RF)-interface base station in the DAS is provided. The process comprises: obtaining a first propagation time delay for a first DAS propagation path and a second propagation time delay for a second DAS propagation path; obtaining at least one of a time delay of a RF donor unit and a digital donor unit; determining a first downlink time delay equal to (i) a largest propagation delay (a) between an antenna port of a radio unit and through the digital donor unit or (b) between the antenna port of the radio unit and through the RF donor unit, less (i) a shortest propagation time delay (x) between the antenna port of the radio unit and through the digital donor unit or (y) between the antenna port of the radio unit and through the RF donor unit; and causing transmission of the first downlink time delay to a delay adjustment circuit in a downlink path of the DAS having the shortest propagation time delay (p) between the antenna port of the radio unit and through the digital donor unit or (q) between the antenna port of the radio unit and through the RF donor unit, wherein the delay adjustment circuit is configured to delay TDD downlink data in the downlink path by the first downlink time delay.

BRIEF DESCRIPTION OF THE DRAWINGS

Comprehension of embodiments of the invention is facilitated by reading the following detailed description in conjunction with the annexed drawings, in which.

DETAILED DESCRIPTION

Embodiments of the invention include DASs configured to compensate for the aforementioned time delays in propagation paths to a radio unit from both of the digital interface base station and the RF-interface base station. Embodiments of the invention are applicable to a communications system including DAS(s) utilizing either frequency division duplexing (FDD) or TDD; however, for pedagogical purposes, subsequent embodiments of the invention are illustrated using TDD. A start time of contemporaneous radio frames of downlink data originating from each of an RF-interface base station and a digital interface base station are time aligned in the radio unit.

The digital interface base station may be, for example one of a common public radio interface (CPRI) BBU, an evolved CPRI (eCPRI) BBU, or an O-RAN distributed unit. For a CPRI BBU, the digital donor unit is a CPRI donor interface. For an eCPRI BBU, the digital donor unit is an eCPRI donor interface. For an O-RAN distributed unit, the digital donor unit is an O-RAN donor interface.

To align start times of radio frames (originating from each of an RF-interface base station and a digital interface base station) differences in propagation time delays in downlink paths of both types of base stations must be compensated. Each of the delays between (a) the radio unit and the digital donor unit and (b) the radio unit and the RF donor can be determined in a manner subsequently described.

The RF donor has an RF donor time delay, tRFD. The digital donor unit has a digital donor unit time delay, tNRFD. The RF donor time delay and the digital donor time delay are known and may be characterized, e.g., prior to installation in the DAS or during DAS operation. The RF donor time delay may exceed the digital donor unit time delay due to the digitization and the down conversion performed by the RF donor and not performed by the digital donor unit.

Exemplary embodiments of the invention are described which disclose obtaining at least some of the aforementioned parameters and utilizing them so that a start time of contemporaneous radio frames of data originating from each of the digital interface base station and the RF interface base station are time aligned in the radio unit. Such parameters may be used to adjust at least one delay in the radio unit, and optionally uplink and downlink antenna delays in one or both of the digital interface base station and the RF-interface base station.

Figure 1A:
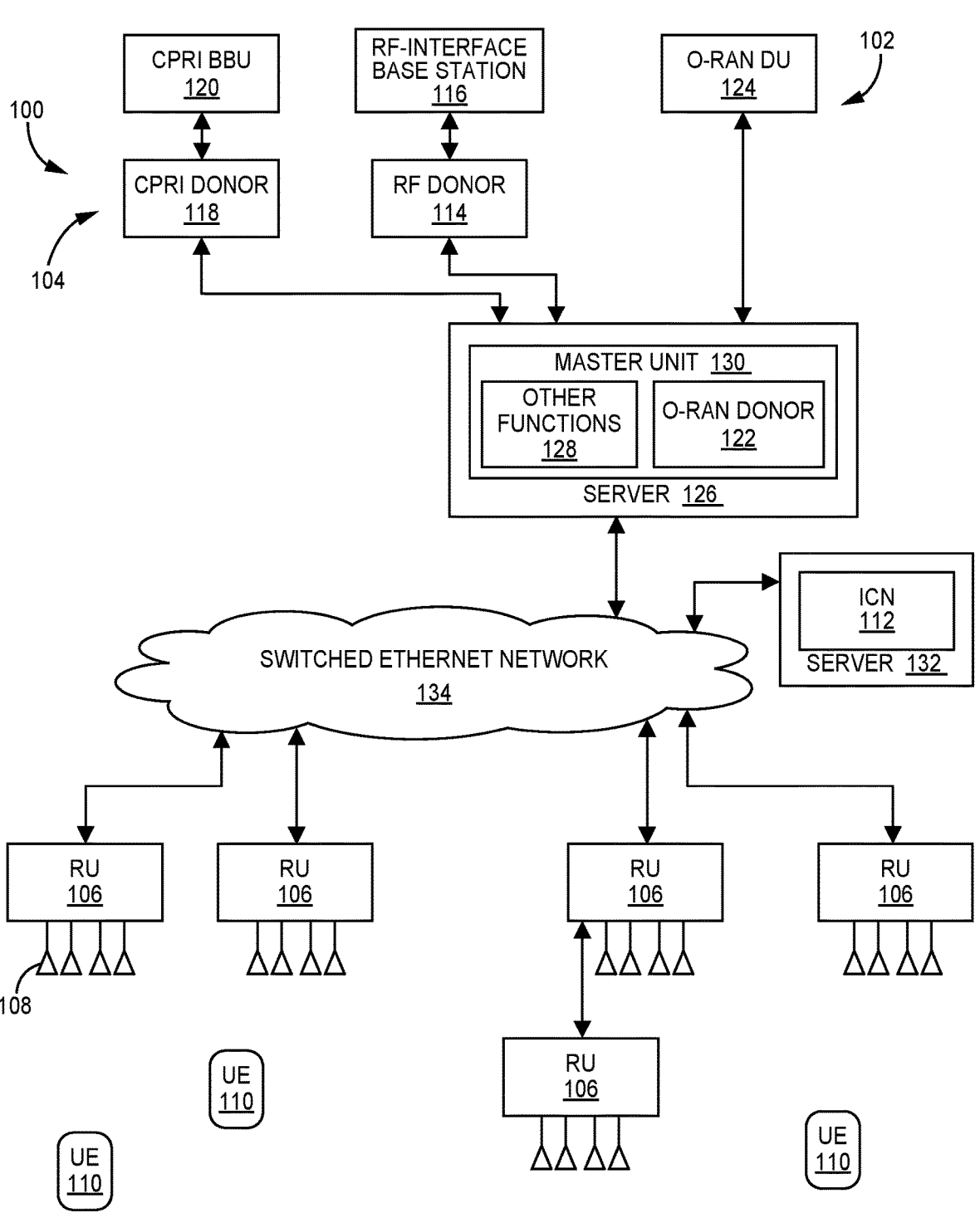
FIG. 1A is a block diagram illustrating an exemplary embodiment of a distributed antenna system (DAS) that is configured to serve one or more base stations.

Prior to describing the embodiments of the invention in further detail, exemplary embodiments of DASs which can employ the invention are first illustrated. FIG. 1A is a block diagram illustrating an exemplary embodiment of a distributed antenna system (DAS) 100 that is configured to serve one or more base stations 102. In the exemplary embodiment shown in FIG. 1A, the DAS 100 includes one or more donor units 104 that are used to couple the DAS 100 to the base stations 102. The DAS 100 also includes a plurality of remotely located radio units (RUs) 106 (also referred to as "antenna units," "access points," "remote units," or "remote antenna units"). The RUs 106 are communicatively coupled to the donor units 104. A donor unit may also be referred to herein as a donor, a donor interface, or a donor interface circuit.

Each RU 106 includes, or is otherwise associated with, a respective set of coverage antennas 108 via which downlink analog RF signals can be radiated to user equipment (UEs) 110 and via which uplink analog RF signals transmitted by UEs 110 can be received. The DAS 100 is configured to serve each base station 102 using a respective subset of RUs 106 (which may include less than all of the RUs 106 of the DAS 100). Also, the subsets of RUs 106 used to serve the base stations 102 may differ from base station 102 to base station 102. The subset of RUs 106 used to serve a given base station 102 is also referred to here as the "simulcast zone" for that base station 102. In general, the wireless coverage of a base station 102 served by the DAS 100 is improved by radiating a set of downlink RF signals for that base station 102 from the coverage antennas 108 associated with the multiple RUs 106 in that base station's stations simulcast zone and by producing a single "combined" set of uplink base station signals or data that is provided to that base station 102. The single combined set of uplink base station signals or data is produced by a combining or summing process that uses inputs derived from the uplink RF signals received via the coverage antennas 108 associated with the RUs 106 in that base station's simulcast zone.

The DAS 100 can also include one or more intermediary combining nodes (ICNs) 112 (also referred to as "expansion" units or nodes). For each base station 102 served by a given ICN 112, the ICN 112 is configured to receive a set of uplink transport data for that base station 102 from a group of "southbound" entities (that is, from RUs 106 and/or other ICNs 112) and generate a single set of combined uplink transport data for that base station 102, which the ICN 112 transmits "northbound" towards the donor unit 104 serving that base station 102. The single set of combined uplink transport data for each served base station 102 is produced by a combining or summing process that uses inputs derived from the uplink RF signals received via the coverage antennas 108 of any southbound RUs 106 included in that base station's simulcast zone. As used here, "southbound" refers to traveling in a direction "away," or being relatively "farther," from the donor units 104 and base stations 102, and "northbound" refers to traveling in a direction "towards", or being relatively "closer" to, the donor units 104 and base stations 102.

In some configurations, each ICN 112 also forwards downlink transport data to the group of southbound RUs 106 and/or ICNs 112 served by that ICN 112. Generally, ICNs 112 can be used to increase the number of RUs 106 that can be served by the donor units 104 while reducing the processing and bandwidth load relative to having the additional RUs 106 communicate directly with each such donor unit 104.

Also, one or more RUs 106 can be configured in a "daisy-chain" or "ring" configuration in which transport data for at least some of those RUs 106 is communicated via at least one other RU 106. Each RU 106 would also perform the combining or summing process for any base station 102 that is served by that RU 106 and one or more of the southbound entities subtended from that RU 106. (Such a RU 106 also forwards northbound all other uplink transport data received from its southbound entities.)

The DAS 100 can include various types of donor units 104. One example of a donor unit 104 is an RF donor unit 114 that is configured to couple the DAS 100 to a base station 116 using the external analog radio frequency (RF) interface of the base station 116 that would otherwise be used to couple the base station 116 to one or more antennas (if the DAS 100 were not being used). This type of base station 116 is also referred to here as an "RF-interface" base station 116. An RF-interface base station 116 can be coupled to a corresponding RF donor unit 114 by coupling each antenna port of the base station 116 to a corresponding port of the RF donor unit 114.

Each RF donor unit 114 serves as an interface between each served RF-interface base station 116 and the rest of the DAS 100 and receives downlink base station signals from, and outputs uplink base station signals to, each served RF-interface base station 116. Each RF donor unit 114 performs at least some of the conversion processing necessary to convert the base station signals to and from the digital fronthaul interface format natively used in the DAS 100 for communicating time-domain baseband data. The downlink and uplink base station signals communicated between the RF-interface base station 116 and the donor unit 114 are analog RF signals. Also, in this example, the digital fronthaul interface format natively used in the DAS 100 for communicating time-domain baseband data can comprise the O-RAN fronthaul interface, a CPRI or enhanced CPRI (eCPRI) digital fronthaul interface format, or a proprietary digital fronthaul interface format (though other digital fronthaul interface formats can also be used).

Another example of a donor unit 104 is a digital donor unit that is configured to communicatively couple the DAS 100 to a baseband entity using a digital baseband fronthaul interface that would otherwise be used to couple the baseband entity to a radio unit (if the DAS 100 were not being used). In the example shown in FIG. 1A, two types of digital door units are shown.

The first type of digital donor unit comprises a digital donor unit 118 that is configured to communicatively couple the DAS 100 to a baseband unit (BBU) 120 using a time-domain baseband fronthaul interface implemented in accordance with a Common Public Radio Interface ("CPRI") specification. This type of digital donor unit 118 is also referred to here as a "CPRI" donor unit 118, and this type of BBU 120 is also referred to here as a CPRI BBU 120. For each CPRI BBU 120 served by a CPRI donor unit 118, the CPRI donor unit 118 is coupled to the CPRI BBU 120 using the CPRI digital baseband fronthaul interface that would otherwise be used to couple the CPRI BBU 120 to a CPRI remote radio head (RRH) (if the DAS 100 were not being used). A CPRI BBU 120 can be coupled to a corresponding CPRI donor unit 118 via a direct CPRI connection.

Each CPRI donor unit 118 serves as an interface between each served CPRI BBU 120 and the rest of the DAS 100 and receives downlink base station signals from, and outputs uplink base station signals to, each CPRI BBU 120. Each CPRI donor unit 118 performs at least some of the conversion processing necessary to convert the CPRI base station data to and from the digital fronthaul interface format natively used in the DAS 100 for communicating time-domain baseband data. The downlink and uplink base station signals communicated between each CPRI BBU 120 and the CPRI donor unit 118 comprise downlink and uplink fronthaul data generated and formatted in accordance with the CPRI baseband fronthaul interface.

The second type of digital donor unit comprises a digital donor unit 122 that is configured to communicatively couple the DAS 100 to a BBU 120 using a frequency-domain baseband fronthaul interface implemented in accordance with a O-RAN Alliance specification. The acronym "O-RAN" is an abbreviation for "Open Radio Access Network." This type of digital donor unit 122 is also referred to here as an "O-RAN" donor unit 122, and this type of BBU 120 is typically an O-RAN distributed unit (DU) and is also referred to here as an O-RAN DU 124. For each O-RAN DU 124 served by a O-RAN donor unit 122, the O-RAN donor unit 122 is coupled to the O-DU 124 using the O-RAN digital baseband fronthaul interface that would otherwise be used to couple the O-RAN DU 124 to a O-RAN RU (if the DAS 100 were not being used). An O-RAN DU 124 can be coupled to a corresponding O-RAN donor unit 122 via a switched Ethernet network. Alternatively, an O-RAN DU 124 can be coupled to a corresponding O-RAN donor unit 122 via a direct Ethernet or CPRI connection.

Each O-RAN donor unit 122 serves as an interface between each served O-RAN DU 124 and the rest of the DAS 100 and receives downlink base station signals from, and outputs uplink base station signals to, each O-RAN DU 124. Each O-RAN donor unit 122 performs at least some of any conversion processing necessary to convert the base station signals to and from the digital fronthaul interface format natively used in the DAS 100 for communicating frequency-domain baseband data. The downlink and uplink base station signals communicated between each O-RAN DU 124 and the O-RAN donor unit 122 comprise downlink and uplink fronthaul data generated and formatted in accordance with the O-RAN baseband fronthaul interface, where the user-plane data comprises frequency-domain baseband IQ data. Also, in this example, the digital fronthaul interface format natively used in the DAS 100 for communicating O-RAN fronthaul data is the same O-RAN fronthaul interface used for communicating base station signals between each O-RAN DU 124 and the O-RAN donor unit 122, and the "conversion" performed by each O-RAN donor unit 122 (and/or one or more other entities of the DAS 100) includes performing any needed "multicasting" of the downlink data received from each O-RAN DU 124 to the multiple RUs 106 in a simulcast zone for that O-RAN DU 124 (for example, by communicating the downlink fronthaul data to an appropriate multicast address and/or by copying the downlink fronthaul data for communication over different fronthaul links) and performing any need combining or summing of the uplink data received from the RUs 106 to produce combined uplink data provided to the O-RAN DU 124. It is to be understood that other digital fronthaul interface formats can also be used.

Optionally, each RF donor and CPRI donor can be deployed in the same physical server used to implement the master unit (for example, where the RF donor and CPRI donor communicates with the master unit using a PCIe lane of the physical server). Alternatively, each RFD card and CPRI digital donor card can be deployed as a standalone device that communicates with the master unit (and/or other nodes or components of the DAS) via a switched Ethernet network that is otherwise used for communications between the nodes of the DAS.

In general, the various base stations 102 are configured to communicate with a core network (not shown) of the associated wireless operator using an appropriate backhaul network (typically, a public wide area network such as the Internet). Also, the various base stations 102 may be from multiple, different wireless operators and/or the various base stations 102 may support multiple, different wireless protocols and/or RF bands.

In general, for each base station 102, the DAS 100 is configured to receive a set of one or more downlink base station signals from the base station 102 (via an appropriate donor unit 104), generate downlink transport data derived from the set of downlink base station signals, and transmit the downlink transport data to the RUs 106 in the base station's simulcast zone. For each base station 102 served by a given RU 106, the RU 106 is configured to receive the downlink transport data transmitted to it via the DAS 100 and use the received downlink transport data to generate one or more downlink analog radio frequency signals that are radiated from one or more coverage antennas 108 associated with that RU 106 for reception by user equipment 110. In this way, the DAS 100 increases the coverage area for the downlink capacity provided by the base stations 102. Also, for any southbound entities (for example, southbound RUs 106 or ICNs 112) coupled to the RU 106 (for example, in a daisy chain or ring architecture), the RU 106 forwards any downlink transport data intended for those southbound entities towards them.

For each base station 102 served by a given RU 106, the RU 106 is configured to receive one or more uplink radio frequency signals transmitted from the user equipment 110. These signals are analog radio frequency signals and are received via the coverage antennas 108 associated with that RU 106. The RU 106 is configured to generate uplink transport data derived from the one or more remote uplink radio frequency signals received for the served base station 102 and transmit the uplink transport data northbound towards the donor unit 104 coupled to that base station 102.

For each base station 102 served by the DAS 100, a single "combined" set of uplink base station signals or data is produced by a combining or summing process that uses inputs derived from the uplink RF signals received via the RUs 106 in that base station's simulcast zone. The resulting final single combined set of uplink base station signals or data is provided to the base station 102. This combining or summing process can be performed in a centralized manner in which the combining or summing process is performed by a single unit of the DAS 100 (for example, a donor unit 104 or master unit 130). This combining or summing process can also be performed in a distributed or hierarchical manner in which the combining or summing process is performed by multiple units of the DAS 100 (for example, a donor unit 104 (or master unit 130) and one or more ICNs 112 and/or RUs 106). Each unit of the DAS 100 that performs the combining or summing process for a given base station 102 receives uplink transport data from that unit's southbound entities and uses that data to generate combined uplink transport data, which the unit transmits northbound towards the base station 102. The generation of the combined uplink transport data involves, among other things, extracting in-phase and quadrature (IQ) data from the received uplink transport data and performing a combining or summing process using any uplink IQ data for that base station 102 in order to produce combined uplink IQ data.

Some of the details regarding how base station signals or data are communicated and transport data is produced vary based on which type of base station 102 is being served. In the case of an RF-interface base station 116, the associated RF donor unit 114 receives analog downlink RF signals from the RF-interface base station 116 and, either alone or in combination with one or more other units of the DAS 100, converts the received analog downlink RF signals to the digital fronthaul interface format natively used in the DAS 100 for communicating time-domain baseband data (for example, by digitizing, digitally down-converting, and filtering the received analog downlink RF signals in order to produce digital baseband IQ data and formatting the resulting digital baseband IQ data into packets) and communicates the resulting packets of downlink transport data to the various RUs 106 in the simulcast zone of that base station 116. The RUs 106 in the simulcast zone for that base station 116 receive the downlink transport data and use it to generate and radiate downlink RF signals as described above. In the uplink, either alone or in combination with one or more other units of the DAS 100, the RF donor unit 114 generates a set of uplink base station signals from uplink transport data received by the RF donor unit 114 (and/or the other units of the DAS 100 involved in this process). The set of uplink base station signals is provided to the served base station 116. The uplink transport data is derived from the uplink RF signals received at the RUs 106 in the simulcast zone of the served base station 116 and communicated in packets.

In the case of a CPRI BBU 120, the associated CPRI digital donor unit 118 receives CPRI downlink fronthaul data from the CPRI BBU 120 and, either alone or in combination with another unit of the DAS 100, converts the received CPRI downlink fronthaul data to the digital fronthaul interface format natively used in the DAS 100 for communicating time-domain baseband data (for example, by re-sampling, synchronizing, combining, separating, gain adjusting, etc. the CPRI baseband IQ data, and formatting the resulting baseband IQ data into packets), and communicates the resulting packets of downlink transport data to the various RUs 106 in the simulcast zone of that CPRI BBU 120. The RUs 106 in the simulcast zone of that CPRI BBU 120 receive the packets of downlink transport data and use them to generate and radiate downlink RF signals as described above. In the uplink, either alone or in combination with one or more other units of the DAS 100, the CPRI donor unit 118 generates uplink base station data from uplink transport data received by the CPRI donor unit 118 (and/or the other units of the DAS 100 involved in this process). The resulting uplink base station data is provided to that CPRI BBU 120. The uplink transport data is derived from the uplink RF signals received at the RUs 106 in the simulcast zone of the CPRI BBU 120.

In the case of an O-RAN DU 124, the associated O-RAN donor unit 122 receives packets of O-RAN downlink fronthaul data (that is, O-RAN user-plane and control-plane messages) from each O-RAN DU 124 coupled to that O-RAN digital donor unit 122 and, either alone or in combination with another unit of the DAS 100, converts (if necessary) the received packets of O-RAN downlink fronthaul data to the digital fronthaul interface format natively used in the DAS 100 for communicating O-RAN baseband data and communicates the resulting packets of downlink transport data to the various RUs 106 in a simulcast zone for that ORAN DU 124. The RUs 106 in the simulcast zone of each O-RAN DU 124 receive the packets of downlink transport data and use them to generate and radiate downlink RF signals as described above. In the uplink, either alone or in combination with one or more other units of the DAS 100, the O-RAN donor unit 122 generates packets of uplink base station data from uplink transport data received by the O-RAN donor unit 122 (and/or the other units of the DAS 100 involved in this process). The resulting packets of uplink base station data are provided to the O-RAN DU 124. The uplink transport data is derived from the uplink RF signals received at the RUs 106 in the simulcast zone of the served O-RAN DU 124 and communicated in packets.

In one implementation, one of the units of the DAS 100 is also used to implement a "master" timing entity for the DAS 100 (for example, such a master timing entity can be implemented as a part of a master unit 130 described below). In another example, a separate, dedicated timing master entity (not shown) is provided within the DAS 100. In either case, the master timing entity synchronizes itself to an external timing master entity (for example, a timing master associated with one or more of the O-DUs 124) and, in turn, that entity serves as a timing master entity for the other units of the DAS 100. A time synchronization protocol (for example, the Institute of Electrical and Electronics Engineers (IEEE) 1588 Precision Time Protocol (PTP), the Network Time Protocol (NTP), or the Synchronous Ethernet (SyncE) protocol) can be used to implement such time synchronization A management system (not shown) can be used to manage the various nodes of the DAS 100. In one implementation, the management system communicates with a predetermined "master" entity for the DAS 100 (for example, the master unit 130 described below), which in turns forwards or otherwise communicates with the other units of the DAS 100 for management-plane purposes. In another implementation, the management system communicates with the various units of the DAS 100 directly for management-plane purposes (that is, without using a master entity as a gateway).

Each base station 102 (including each RF-interface base station 116, CPRI BBU 120, and O-RAN DU 124), donor unit 104 (including each RF donor unit 114, CPRI donor unit 118, and O-RAN donor unit 122), RU 106, ICN 112, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.). Such entities can be implemented in other ways.

The DAS 100 can be implemented in a virtualized manner or a non-virtualized manner. When implemented in a virtualized manner, one or more nodes, units, or functions of the DAS 100 are implemented using one or more virtual network functions (VNFs) executing on one or more physical server computers (also referred to here as "physical servers" or just "servers") (for example, one or more commercial-off-the-shelf (COTS) servers of the type that are deployed in data centers or "clouds" maintained by enterprises, communication service providers, or cloud services providers). More specifically, in the exemplary embodiment shown in FIG. 1A, each O-RAN donor unit 122 is implemented as a VNF running on a server 126. The server 126 can execute other VNFs 128 that implement other functions for the DAS 100 (for example, fronthaul, management plane, and synchronization plane functions). The various VNFs executing on the server 126 are also referred to here as "master unit" functions 130 or, collectively, as the "master unit" 130. Also, in the exemplary embodiment shown in FIG. 1A, each ICN 112 is implemented as a VNF running on a server 132.

The RF donor units 114 and CPRI donor units 118 can be implemented as cards (for example, Peripheral Component Interconnect (PCI) Cards) that are inserted in the server 126. Alternatively, the RF donor units 114 and CPRI donor units

118 can be implemented as separate devices that are coupled to the server 126 via dedicated Ethernet links or via a switched Ethernet network (for example, the switched Ethernet network 134 described below).

In the exemplary embodiment shown in FIG. 1A, the donor units 104, RUs 106 and ICNs 112 are communicatively coupled to one another via a switched Ethernet network 134. Also, in the exemplary embodiment shown in FIG. 1A, an O-RAN DU 124 can be coupled to a corresponding O-RAN donor unit 122 via the same switched Ethernet network 134 used for communication within the DAS 100 (though each O-RAN DU 124 can be coupled to a corresponding O-RAN donor unit 122 in other ways). In the exemplary embodiment shown in FIG. 1A, the downlink and uplink transport data communicated between the units of the DAS 100 is formatted as O-RAN data that is communicated in Ethernet packets over the switched Ethernet network 134.

In the exemplary embodiment shown in FIG. 1A, the RF donor units 114 and CPRI donor units 118 are coupled to the RUs 106 and ICNs 112 via the master unit 130.

In the downlink, the RF donor units 114 and CPRI donor units 118 provide downlink time-domain baseband IQ data to the master unit 130. The master unit 130 generates downlink O-RAN user-plane messages containing downlink baseband IQ that is either the time-domain baseband IQ data provided from the donor units 114 and 118 or is derived therefrom (for example, where the master unit 130 converts the received time-domain baseband IQ data into frequency-domain baseband IQ data). The master unit 130 also generates corresponding downlink O-RAN control-plane messages for those O-RAN user-plane messages. The resulting downlink O-RAN user-plane and control-plane messages are communicated (multicasted) to the RUs 106 in the simulcast zone of the corresponding base station 102 via the switched Ethernet network 134.

In the uplink, for each RF-interface base station 116 and CPRI BBU 120, the master unit 130 receives O-RAN uplink user-plane messages for the base station 116 or CPRI BBU 120 and performs a combining or summing process using the uplink baseband IQ data contained in those messages in order to produce combined uplink baseband IQ data, which is provided to the appropriate RF donor unit 114 or CPRI donor unit 118. The RF donor unit 114 or CPRI donor unit 118 uses the combined uplink baseband IQ data to generate a set of base station signals or CPRI data that is communicated to the corresponding RF-interface base station 116 or CPRI BBU 120. If time-domain baseband IQ data has been converted into frequency-domain baseband IQ data for transport over the DAS 100, the donor unit 114 or 118 also converts the combined uplink frequency-domain IQ data into combined uplink time-domain IQ data as part of generating the set of base station signals or CPRI data that is communicated to the corresponding RF-interface base station 116 or CPRI BBU 120.

In the exemplary embodiment shown in FIG. 1A, the master unit 130 (more specifically, the O-RAN donor unit 122) receives downlink O-RAN user-plane and control-plane messages from each served O-RAN DU 124 and communicates (multicasts) them to the RUs 106 in the simulcast zone of the corresponding O-RAN DU 124 via the switched Ethernet network 134. In the uplink, the master unit 130 (more specifically, the O-RAN donor unit 122) receives O-RAN uplink user-plane messages for each served O-RAN DU 124 and performs a combining or summing process using the uplink baseband IQ data contained in those messages in order to produce combined uplink IQ data. The O-RAN donor unit 122 produces O-RAN uplink user-plane messages containing the combined uplink baseband IQ data and communicates those messages to the O-RAN DU 124.

In the exemplary embodiment shown in FIG. 1A, only uplink transport data is communicated using the ICNs 112, and downlink transport data is communicated from the master unit 130 to the RUs 106 without being forwarded by, or otherwise communicated using, the ICNs 112.

Figure 1B:
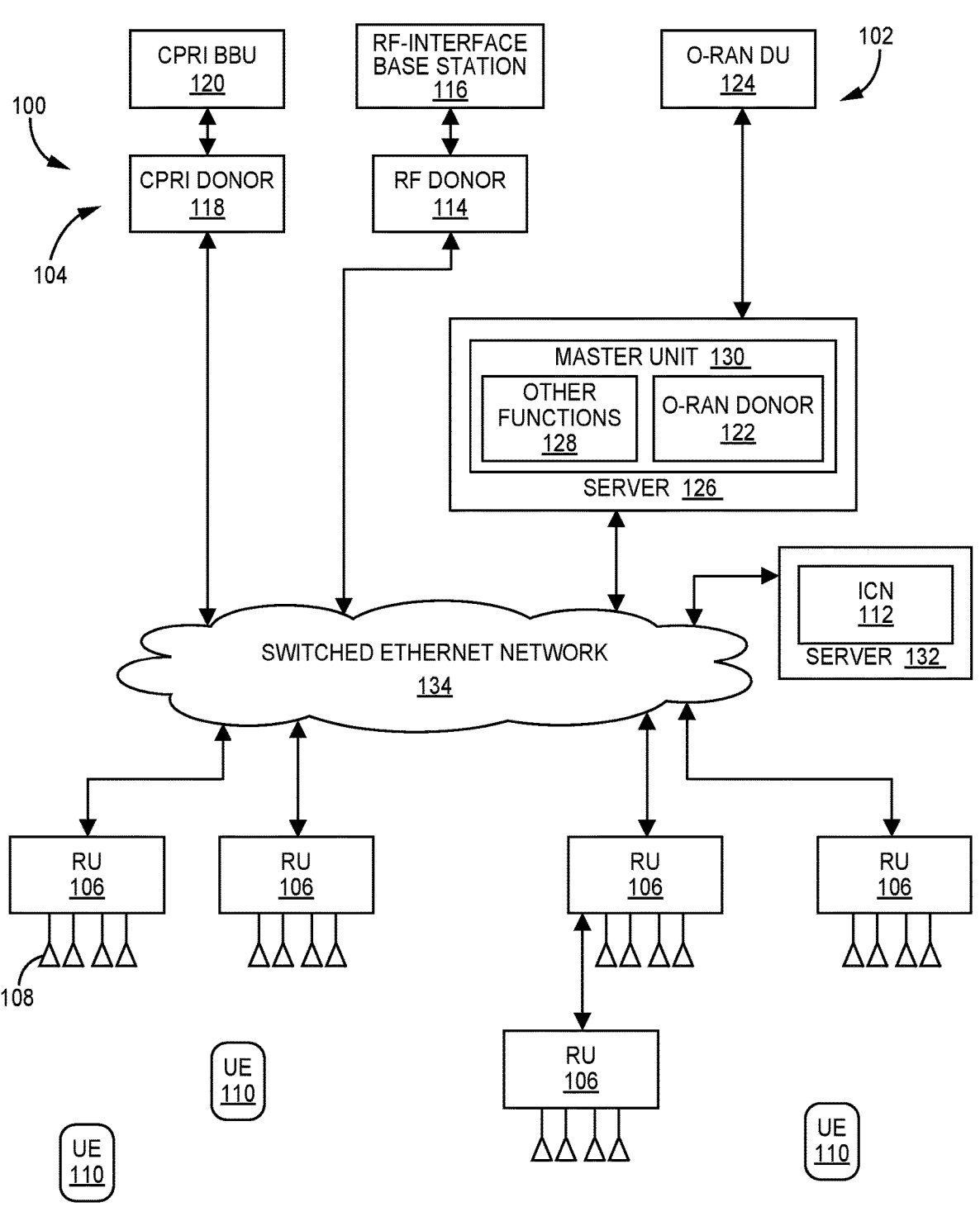
FIG. 1B illustrates another exemplary embodiment of a DAS.

FIG. 1B illustrates another exemplary embodiment of a DAS 100. The DAS 100 shown in FIG. 1B is the same as the DAS 100 shown in FIG. 1A except as described below. In the exemplary embodiment shown in FIG. 1B, the RF donor units 114 and CPRI donor units 118 are coupled directly to the switched Ethernet network 134 and not via the master unit 130, as is the case in the embodiment shown in FIG. 1A.

As described above, in the exemplary embodiment shown in FIG. 1A, the master unit 130 performs some transport functions related to serving the RF-interface base stations 116 and CPRI BBUs 120 coupled to the donor units 114 and 118. In the exemplary embodiment shown in FIG. 1B, the RF donor units 114 and CPRI donor units 118 perform those transport functions (that is, the RF donor units 114 and CPRI donor units 118 perform all of the transport functions related to serving the RF-interface base stations 116 and CPRI BBUs 120, respectively).

Figure 1C:
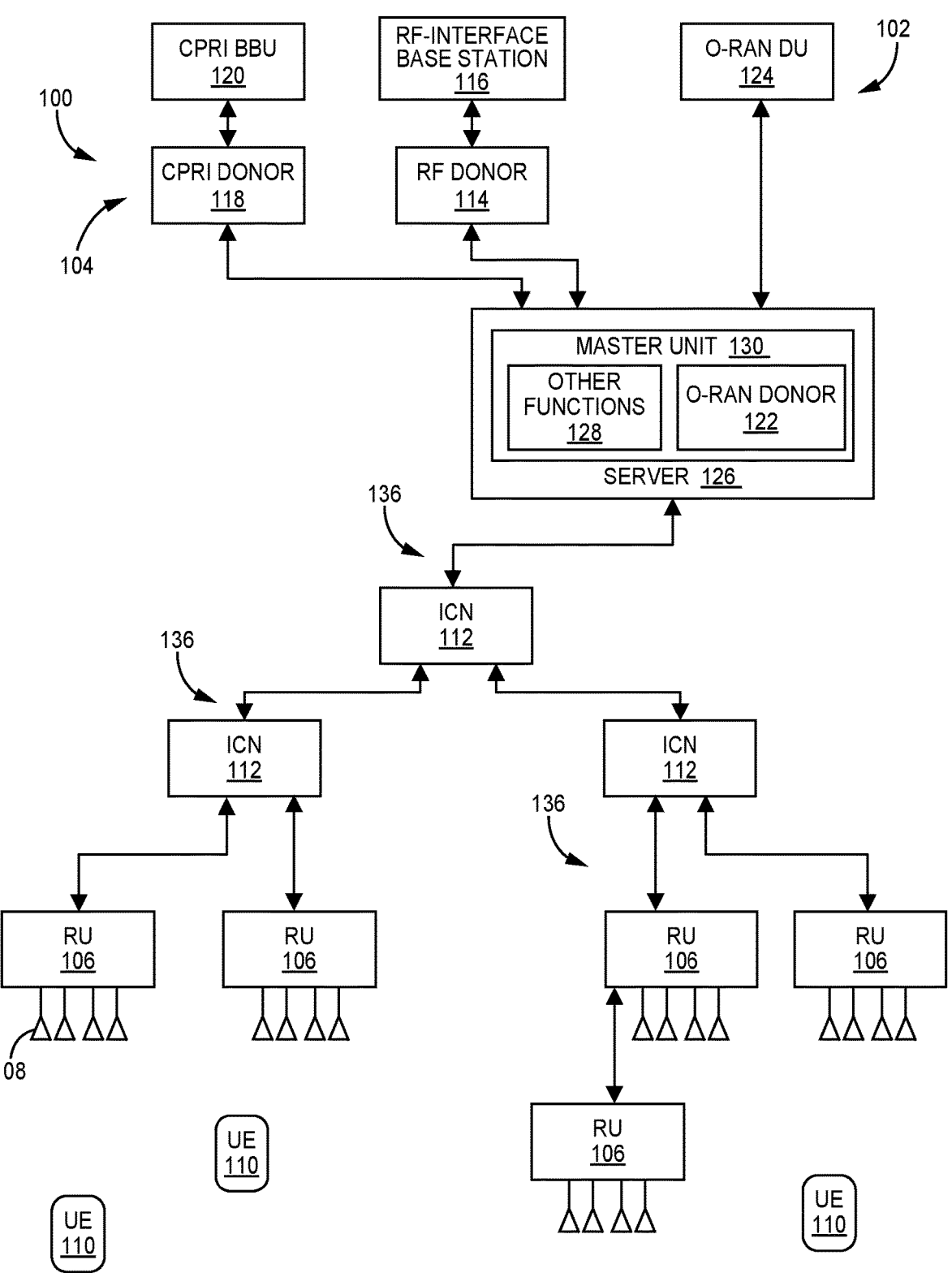
FIG. 1C illustrates another exemplary embodiment of a DAS.

FIG. 1C illustrates another exemplary embodiment of a DAS 100. The DAS 100 shown in FIG. 1C is the same as the DAS 100 shown in FIG. 1A except as described below. In the exemplary embodiment shown in FIG. 1C, the donor units 104, RUs 106 and ICNs 112 are communicatively coupled to one another via point-to-point Ethernet links 136 (instead of a switched Ethernet network). Also, in the exemplary embodiment shown in FIG. 1C, an O-RAN DU 124 can be coupled to a corresponding O-RAN donor unit 122 via a switched Ethernet network (not shown in FIG. 1C), though that switched Ethernet network is not used for communication within the DAS 100. In the exemplary embodiment shown in FIG. 1C, the downlink and uplink transport data communicated between the units of the DAS 100 is communicated in Ethernet packets over the point-to-point Ethernet links 136.

For each southbound point-to-point Ethernet link 136 that couples a master unit 130 to an ICN 112, the master unit 130 assembles downlink transport frames and communicates them in downlink Ethernet packets to the ICN 112 over the point-to-point Ethernet link 136. For each point-to-point Ethernet link 136, each downlink transport frame multiplexes together downlink time-domain baseband IQ data and Ethernet data that needs to be communicated to southbound RUs 106 and ICNs 112 that are coupled to the master unit 130 via that point-to-point Ethernet link 136. The downlink time-domain baseband IQ data is sourced from one or more RF donor units 114 and/or CPRI donor units 118. The Ethernet data comprises downlink user-plane and control-plane O-RAN fronthaul data sourced from one or more O-RAN donor units 122 and/or management-plane data sourced from one or more management entities for the DAS 100. That is, this Ethernet data is encapsulated into downlink transport frames that are also used to communicate downlink time-domain baseband IQ data and this Ethernet data is also referred to here as "encapsulated" Ethernet data. The resulting downlink transport frames are communicated in the payload of downlink Ethernet packets communicated from the master unit 130 to the ICN 112 over the point-to-point Ethernet link 136. The Ethernet packets into which the encapsulated Ethernet data is encapsulated are also referred to here as "transport" Ethernet packets.

Each ICN 112 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. Any encapsulated Ethernet data that is intended for the ICN 112 (for example, management-plane Ethernet data) is processed by the ICN 112.

For each southbound point-to-point Ethernet link 136 coupled to the ICN 112, the ICN 112 assembles downlink transport frames and communicates them in downlink Ethernet packets to the southbound entities subtended from the ICN 112 via the point-to-point Ethernet link 136. For each southbound point-to-point Ethernet link 136, each downlink transport frame multiplexes together downlink time-domain baseband IQ data and Ethernet data received at the ICN 112 that needs to be communicated to those subtended southbound entities. The resulting downlink transport frames are communicated in the payload of downlink transport Ethernet packets communicated from the ICN 112 to those subtended southbound entities ICN 112 over the point-to-point Ethernet link 136.

Each RU 106 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. As described above, the RU 106 uses any downlink time-domain baseband IQ data and/or downlink O-RAN user-plane and control-plane fronthaul messages to generate downlink RF signals for radiation from the set of coverage antennas 108 associated with that RU 106. The RU 106 processes any management-plane messages communicated to that RU 106 via encapsulated Ethernet data.

Also, for any southbound point-to-point Ethernet link 136 coupled to the RU 106, the RU 106 assembles downlink transport frames and communicates them in downlink Ethernet packets to the southbound entities subtended from the RU 106 via the point-to-point Ethernet link 136. For each southbound point-to-point Ethernet link 136, each downlink transport frame multiplexes together downlink time-domain baseband IQ data and Ethernet data received at the RU 106 that needs to be communicated to those subtended southbound entities. The resulting downlink transport frames are communicated in the payload of downlink transport Ethernet packets communicated from the RU 106 to those subtended southbound entities ICN 112 over the point-to-point Ethernet link 136.

In the uplink, each RU 106 generates uplink time-domain baseband IQ data and/or uplink O-RAN user-plane fronthaul messages for each RF-interface base station 116, CPRI BBU 120, and/or O-RAN DU 124 served by that RU 106 as described above. For each northbound point-to-point Ethernet link 136 of the RU 106, the RU 106 assembles uplink transport frames and communicates them in uplink transport Ethernet packets northbound towards the appropriate master unit 130 via that point-to-point Ethernet link 136. For each northbound point-to-point Ethernet link 136, each uplink transport frame multiplexes together uplink time-domain baseband IQ data originating from that RU 106 and/or any southbound entity subtended from that RU 106 as well as any Ethernet data originating from that RU 106 and/or any southbound entity subtended from that RU 106. In connection with doing this, the RU 106 performs the combining or summing process described above for any base station 102 served by that RU 106 and also by one or more of the subtended entities. (The RU 106 forwards northbound all other uplink data received from those southbound entities.) The resulting uplink transport frames are communicated in the payload of uplink transport Ethernet packets northbound towards the master unit 130 via the associated point-to-point Ethernet link 136.

Each ICN 112 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. For each northbound point-to-point Ethernet link 136 coupled to the ICN 112, the ICN 112 assembles uplink transport frames and communicates them in uplink transport Ethernet packets northbound towards the master unit 130 via that point-to-point Ethernet link 136. For each northbound point-to-point Ethernet link 136, each uplink transport frame multiplexes together uplink time-domain baseband IQ data and Ethernet data received at the ICN 112 that needs to be communicated northbound towards the master unit 130. The resulting uplink transport frames are communicated in the payload of uplink transport Ethernet packets communicated northbound towards the master unit 130 over the point-to-point Ethernet link 136.

Each master unit 130 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. Any extracted uplink time-domain baseband IQ data, as well as any uplink O-RAN messages communicated in encapsulated Ethernet, is used in producing a single "combined" set of uplink base station signals or data for the associated base station 102 as described above (which includes performing the combining or summing process). Any other encapsulated Ethernet data (for example, management-plane Ethernet data) is forwarded on towards the respective destination (for example, a management entity).

In the exemplary embodiment shown in FIG. 1C, synchronization-plane messages are communicated using native Ethernet packets (that is, non-encapsulated Ethernet packets) that are interleaved between the transport Ethernet packets.

Figure 1D:
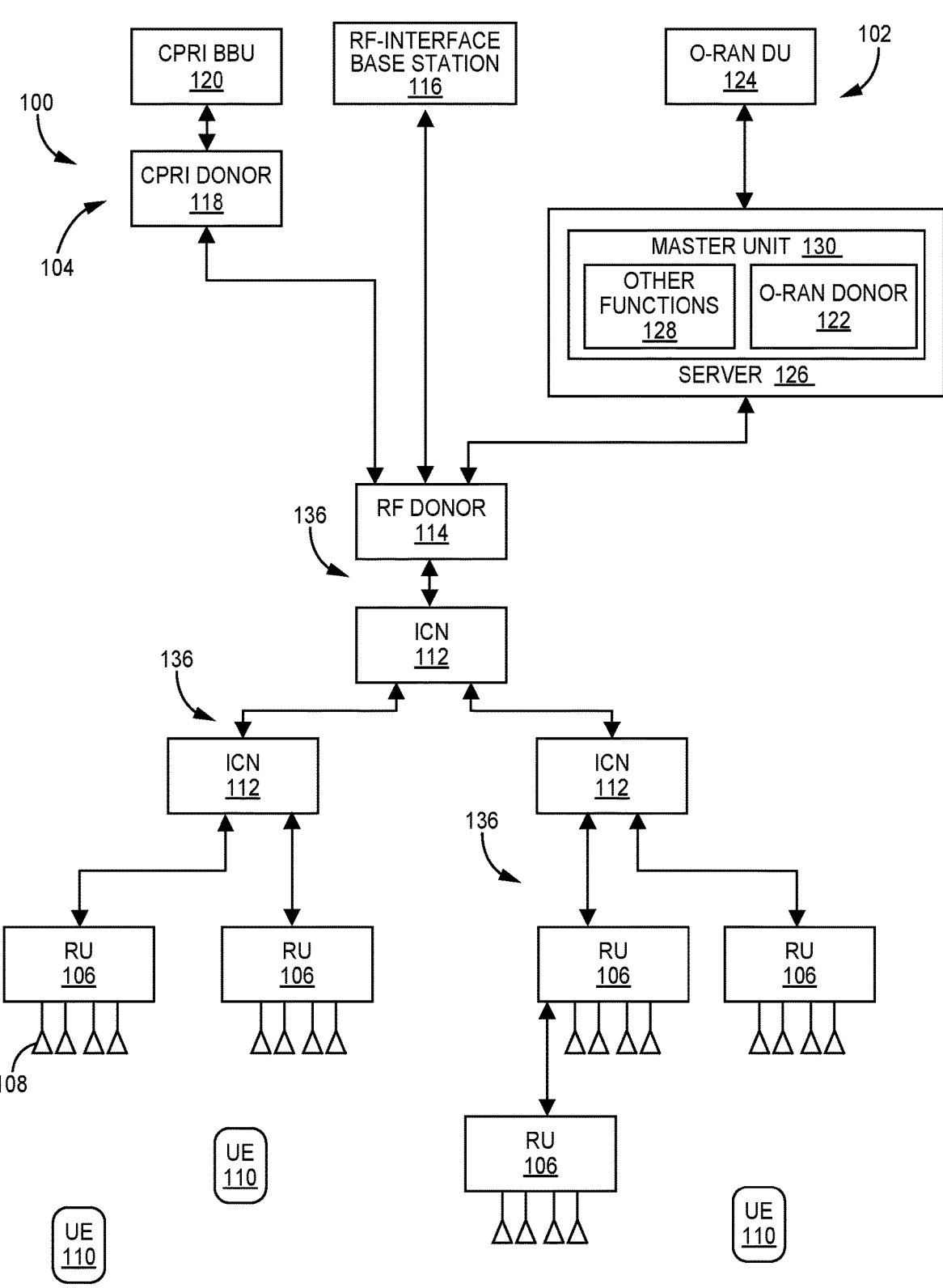
FIG. 1D illustrates another exemplary embodiment of a DAS.

FIG. 1D illustrates another exemplary embodiment of a DAS 100. The DAS 100 shown in FIG. 1C is the same as the DAS 100 shown in FIG. 1C except as described below. In the exemplary embodiment shown in FIG. 1D, the CPRI donor units 118, O-RAN donor unit 122, and master unit 130 are coupled to the RUs 106 and ICNs 112 via one or more RF units 114. That is, each RF donor unit 114 performs the transport frame multiplexing and demultiplexing that is described above in connection with FIG. 1C as being performed by the master unit 130.

Embodiments of the invention may be implemented in the DASs illustrated in FIGS. 1A-1D. It is to be understood that embodiments of the invention may be utilized in other DAS implementations (for example, in a DAS that uses traditional fronthaul transport).

Figure 1E:
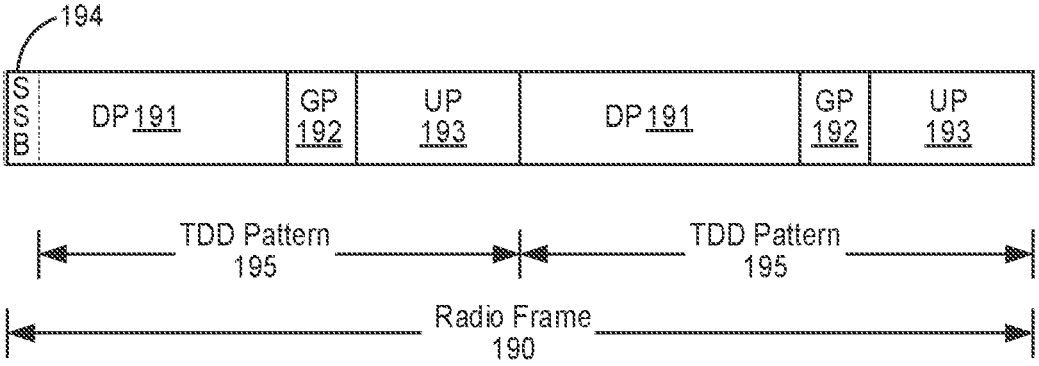
FIG. 1E illustrates a diagram of one embodiment of a radio frame.

Techniques are disclosed for aligning starting times of radio frames of data from a digital interface base station and an RF-interface base station when wirelessly transmitted from a radio unit of a DAS 100. FIG. 1E illustrates a diagram of one embodiment of a radio frame 190. The radio frame 190 typically includes one or more TDD patterns 195. Each TDD pattern 195 includes at least one downlink pattern (DP) 191 and/or at least one uplink pattern (UP) 193 in a specific order. Further, in each pattern, each downlink pattern 191 and each uplink pattern 193 has a specific time period. The time period may vary between the downlink and uplink patterns. Each downlink pattern 191 in a TDD pattern 195 need not have the same time period as another downlink pattern 191 in the same TDD pattern 195; each uplink pattern 193 in a TDD pattern 195 need not have the same time period as another uplink pattern 193 in the same TDD pattern 195. An uplink pattern 193 following a downlink pattern 191 is separated in time by a guard time period (GP) 192.

Each radio frame 190 may include at least one synchronization signal block (SSB) 194 in a radio frame 190, e.g., at the beginning of and/or elsewhere in the radio frame 190. Each SSB 194 in a radio frame 190 is at a known time displacement from the start of the radio frame 190. SSBs may be periodically distributed throughout a radio frame 190. Alternatively, an SSB 194 may be periodically included in a radio frame 190 every nth radio frame, where n is an integer that greater than one, e.g., an integer power of two (e.g., 2, 4, 8, and 16). The SSB 194 may be used to identify the commencement of a radio frame 190. Each radio frame 190 has a start time (to) 197. A different term may be used to describe a synchronization signal in other air interface such as Long Term Evolution (LTE).

Each radio frame having a unique TDD pattern 195 is identified as a unique TDD pattern configuration, e.g., identified by a unique numeric designator. The downlink analog RF signals from the RF-interface base station and the baseband digital downlink data from the digital interface base station utilize the same Radio frame configuration. That Radio frame configuration may or may not be the TDD pattern configuration illustrated in FIG. 1E.

Figure 2A:
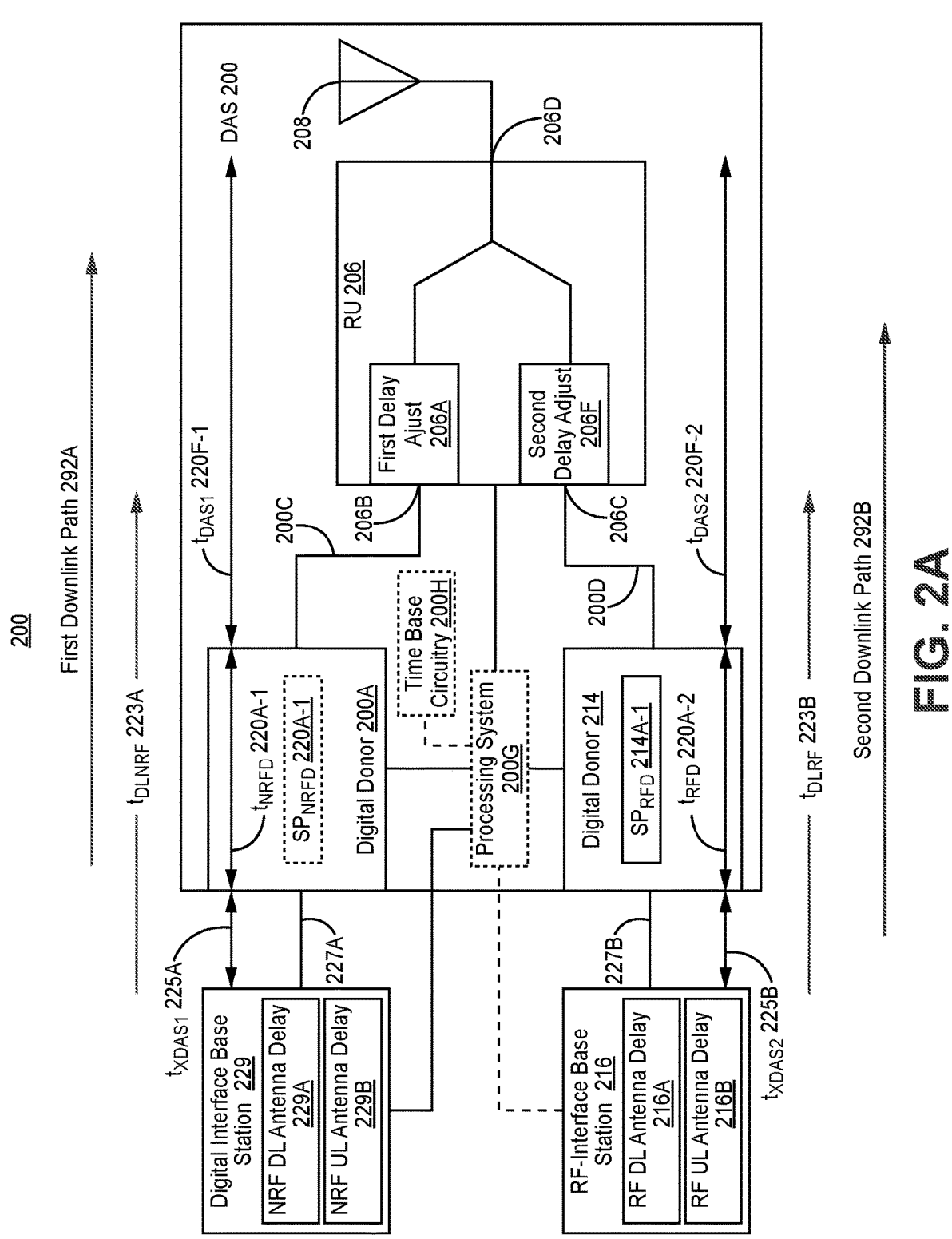
FIG. 2A illustrates a block diagram of one embodiment of a DAS configured to serve a digital interface base station and an RF-interface base station, where radio frames of data from both base stations are time aligned at the radio unit.

FIG. 2A illustrates a block diagram of one embodiment of a DAS 200 configured to serve a digital interface base station 229 and an RF-interface base station 216, where radio frames of data from both base stations are time aligned at a radio unit 206. Embodiments of the invention may be implemented with the DASs illustrated in FIGS. 1A-1D or in other DAS implementations.

There is a first downlink (signal) path 292A from an antenna port of the digital interface base station 229 through the radio unit 206. There is a second downlink (signal) path 292B from an antenna port of the RF-interface base station 216 to the radio unit 206.

The digital interface base station 229 is configured to store a digital interface (NRF) downlink antenna delay 229A and a NRF uplink antenna delay 229B; such delays are used to determine how much to advance timing of signals in a corresponding path to compensate for delays elsewhere in the path. The digital interface base station 229 is communicatively coupled to the DAS 200 through a first communications link 227A to the digital donor unit (digital donor) 200A. The first communications link 227A has a first external propagation time delay ($t_{XDAS1}$) 225A. Optionally, the digital interface base station 229 may obtain $t_{XDAS1}$ 225 by transmitting loopback messages between the digital interface base station 229 and the DAS 200, e.g., the digital donor unit 200A.

The RF-interface base station 216 is configured to store an RF downlink antenna delay 216A and an RF uplink antenna delay 216; such delays are used to advance timing of signals in the downlink path to compensate for delays elsewhere in the downlink path, and to determine when uplink data arrives at the digital interface base station 229. The RF-interface base station 216 is communicatively coupled to the DAS 200 through a second communications link 227B to the RF donor 214. The second communications link 227B has a second external propagation time delay ($t_{xDAS2}$) 225B.

The illustrated DAS 200 comprises the digital donor unit 200A, the RF donor unit 214, a first DAS propagation path 200C, a second DAS propagation path 200D, a radio unit 206, a set of coverage antennas 208, and an optional processing system (or processing circuitry) 200G. Optionally, the DAS 200, e.g., the optional processing system 200G, is communicatively coupled to the RF-interface base station 216. The radio unit 206 has a first input 206B communicatively coupled to a downlink path from the digital donor unit 200A, a second input 206C communicatively coupled to a downlink path from the RF donor unit 214, and an output 206D coupled to a set of coverage antennas. Optionally, the DAS 200 includes time base circuitry 200H coupled to the DAS 200, e.g., the optional processing system 200G, the digital donor unit 200A, and/or the RF donor unit 214; optionally, the optional time base circuitry 200H may be a global navigation satellite system receiver, e.g., a global positioning satellite receiver. The optional time base circuitry 200H is configured to be coupled to, and to provide the time base to, the DAS 200, e.g., the processing system 200G, the digital donor unit 200A, and/or the RF donor unit 214.

As further discussed elsewhere herein, the digital donor unit 200A is configured to receive downlink time-domain digital baseband data from the digital interface base station. The RF donor unit 214 is configured to receive downlink analog RF signals from the RF-interface base station 216.

To time synchronize the DAS 200 with the digital interface base stations 229 and the RF-interface base station 216, the DAS 200 (e.g., the optional processing system 200G, the digital donor unit 200A, and/or the RF donor unit 214) is configured to obtain a time base from the digital interface base station 229; optionally, the time base may be obtained using management plane data. The time bases of the digital interface base station 229 and the RF-interface base station 216 are time synchronized, e.g., by using the same time base.

The optional processing system 200G may be implemented by a state machine (e.g., implemented by a processor circuit coupled to a memory circuit, a field programmable gate array, an application specific integrated circuit, or an alternative implementation) and/or another type of computing system. The optional processing system 200G is illustrated as being a stand-alone entity in the DAS 200; however, in other embodiments the optional processing system 200G may be external to the DAS 200 or in one or more other components of the DAS 200.

The digital donor unit (or digital donor unit circuit) 200A has a digital donor unit propagation time delay ($t_{NRFD}$) 200A-1. The digital donor unit 200A is configured to perform the functions like or similar to the CPRI donor unit 118 or the O-RAN donor unit 122 described elsewhere herein. Optionally, the digital donor unit 200A comprises a digital donor unit signal processor (digital donor unit signal processing circuit or $SP_{NRFD}$) 200A-1. The optional $SP_{NRFD}$ 200A-1 is configured to identify an occurrence of the SSB 194 of each radio frame 190 in the digital downlink data received from the digital interface base station.

The RF donor unit (or RF donor circuit) 214 has an RF donor propagation time delay ($t_{RFD}$) 200A-2. The RF donor unit 214 is configured to perform the functions like the RF donor unit 114 described elsewhere herein. The RF donor unit 214 comprises an RF donor signal processor (digital donor unit signal processing circuit or $SP_{RFD}$) 214A. The DAS 200, e.g., the RF donor unit 214 or the $SP_{RFD}$ 200A-1, is configured to identify an occurrence of the SSB 194 in each radio frame 190 in the analog RF downlink signals received from the RF-interface base station 216. Using the time base from the digital interface base station 229, the DAS 200, e.g., the optional processing system 200G and/or the RF donor unit 214, is configured to determine a time ($t_{RFDETECT}$) based upon a time of occurrence of an SSB in a radio frame of the downlink analog RF signals is detected by the $SP_{RFD}$ 214A of the RF donor 214 and other information indicating what the time difference between timing of the SSB and a start time of the radio frame. The other information indicating the time difference may be known by (e.g., provided to) the DAS 100, 200, determined by the $SP_{RFD}$ 214A, or otherwise determined.

Optionally, a first downlink time delay may be determined in a different manner. Using the time base from the optional time base circuitry 200H, a start time $t_{0NRF}$ for a radio frame (in the digital donor unit 200A) can be determined by the DAS 200, e.g., the optional processing system 200G, based upon when an SSB 194 is detected by $SP_{NRFD}$ 200A-1 in a radio frame 190 by the digital donor unit 200A; further, using the time base from the optional time base circuitry 200H, a start time $t_{0RF}$ for a radio frame (in the RF donor unit 214), contemporaneous with the radio frame in the digital donor unit 200A, can be determined by the DAS 200, e.g., the optional processing system 200G, based upon when an SSB 194 is detected by $SP_{RFD}$ 214A in a radio frame 190 by the RF donor unit 214 and the known time displacement from the start of the radio frame 190 and the SSB 194. This embodiment will be described in more detail elsewhere herein.

The digital donor unit 218 is configured to be coupled to the radio unit 206 through the first DAS propagation path 200C. The first DAS propagation path 200C has a first DAS propagation time delay ($t_{DAS1}$) 200F-1. The first DAS propagation time delay 200F-1 may be known or may be characterized by the DAS 200 after construction of the DAS 200, e.g., by transmitting loopback messages in the path between the digital donor unit 200A and the radio unit 206, and also knowing a time delay through the radio unit 206.

The RF donor unit 214 is configured to be coupled to the radio unit 206 through a second DAS propagation path 200D. The second DAS propagation path 200D has a second DAS propagation time delay ($T_{DAS2}$) 200F-2. The second DAS propagation time delay 200F-2 may be known or may be characterized by the DAS 100, 200 after construction of the DAS 100, 200, e.g., by transmitting loopback messages in the path between the unit 214 and the radio unit 206, and knowing a time delay through the radio unit 206. Each of the first DAS propagation path 200C and the second DAS propagation path 200D may include a master unit 130, at least one ICN 112, an Ethernet network, and/or transmission lines, e.g., copper category (CAT) cable(s) and/or fiber optic cable(s).

The total propagation time delay between the digital interface base station 229 and the radio unit 206 ($t_{DLNRF}$) 223A is a sum of $T_{xDAS1}$ 225A+$T_{NRFD}$ 200A-1+$T_{DAS1}$ 200F-1. The total propagation time delay between the RF-interface base station 216 and the radio unit 206 ($t_{DLRF}$) 223B is a sum of $T_{xDAS2}$ 225A+$T_{RFD}$ 200A-2+$T_{DAS2}$ 200F-2.

The radio unit 206 includes a transmitter and a receiver. Optionally, the radio unit 206 also includes a first delay adjustment unit (first delay adjustment circuit or first delay adjust) 206A in a downlink path of data in radio frames originating from the digital interface base station 229 and a second delay adjustment unit (second delay adjustment circuit or second delay adjust) 206F in a downlink path of data in radio frames originating from the RF-interface base station 216. However, the delay adjustment unit(s) may be located external to the radio unit 206. Each delay adjustment unit 206A, 206F is configured to delay data by an amount of time delay programmed into the delay adjustment unit. Optionally, such delay adjustment units 206A, 206F may be implemented with a buffer (or buffer circuitry). The second delay adjustment unit 206F is optional. Optionally, a single delay adjustment unit, e.g., the first delay adjustment unit 206A may be used; the single delay adjustment unit may be switched between a downlink path between the radio unit 206 and (a) the digital donor unit 200A or (b) the RF donor unit 214; the single delay adjustment unit is used in a downlink path needing a downlink time delay, e.g., a first downlink time delay, stored in the single delay adjustment unit.

At least one of a first, a second, a third, and a fourth downlink time delay are each determined by the DAS 200, e.g., the optional processing system 200G. The first downlink time delay is configured to be stored and used by the radio unit 206 (i.e., in the first delay adjustment unit 206A (when a start time of a radio frame at an input of the radio in the downlink path from the RF-interface base station 216 is delayed behind a start time of a radio frame at the input of the radio in the downlink path from the digital interface base station 229) or the second delay adjustment unit 206F (when a start time of a radio frame at the input of the radio in the downlink path from the at the radio unit 206 from the digital interface base station 229 is delayed behind a start time of a radio frame at an input of the radio in the downlink path from the RF-interface base station 216); the other delay adjustment unit in the radio unit 206 is set to zero which may be its default value. The second downlink time delay is configured to be stored and used by the digital interface base station 229 (i.e., in the NRF DL antenna delay 229A); the default value of the NRF DL antenna delay 229A is zero. The third downlink time delay is configured to be added to a default downlink time delay stored in the RF-interface base station 216 (i.e., in the RF DL antenna delay 216A); the default downlink time delay of the RF-interface base station 216 is determined by a manufacturer or an operator of the RF-interface base station 216. The default downlink time delay is zero or a short period of time, e.g., less than 2 microseconds. The fourth downlink time delay is configured to be added to a default downlink time delay stored in the digital interface base station 229 (i.e., in the NRF DL antenna delay 229A).

Each base station must be configured to know when to expected to receive uplink TDD data sent in uplink paths from the DAS 200 to digital interface base station 229 and the RF-interface base station 216. To do so, a first uplink time delay must be determined; the NRF UL antenna delay 229B is configured to be set to the first uplink time delay.

To achieve radio frame synchronization in an uplink path through the RF-interface base station 216, a second uplink time delay optionally may be determined; the RF UL antenna delay 216B is configured to be set to the second uplink time delay. The second uplink time delay is equal to the third downlink time delay. The second uplink time delay is configured to be added to a default uplink time delay stored in the RF-interface base station 216 (i.e., the RF UL antenna delay 216B); the default uplink time delay of the RF-interface base station 216 is determined by a manufacturer or an operator of the RF-interface base station 216. The default uplink time delay is zero or a short period of time, e.g., less than 2 microseconds.

Each determined downlink and uplink time delay is transmitted from the DAS 200, e.g., the optional processing system 200G, to a corresponding component (i.e., the radio unit 206 (e.g., the first delay adjustment unit 206A), the digital interface base station 229, and/or the RF-interface base station 216) configured to store and use the time delay. The determined downlink time delays are utilized to compensate for differences between $t_{DLNRF}$ 223A and $t_{DLRF}$ 223B and to align start times to 197 of radio frames of data in the radio unit 206. Specific techniques for achieving this are described in the method presented elsewhere herein; the method presented elsewhere herein may be practiced by the system illustrated in FIG. 2A. Each of one or more of the first delay adjustment unit 206A, the second delay adjustment unit 206F, the NRF DL antenna delay 229A, and/or the RF DL antenna delay 216A are configured to delay in time further downlink transmission of data which passes through them.

Figure 2B:
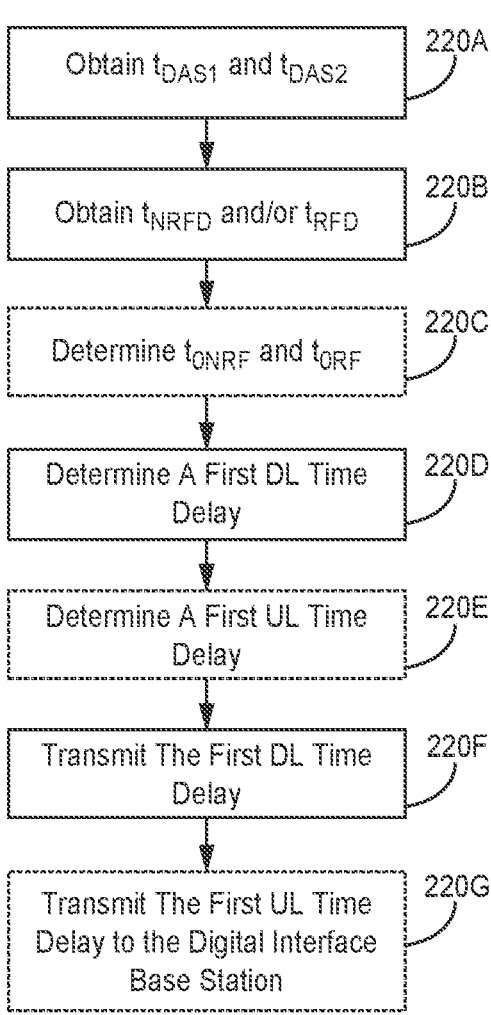
FIG. 2B illustrates a flowchart of one exemplary embodiment of a method of compensating for a delay, between an RF-interface base station and a radio unit, that is greater than a delay between a digital interface base station and the radio unit.

FIG. 2B illustrates a flowchart of one exemplary embodiment of a method 220 of compensating for a delay, between an RF-interface base station and a radio unit, that is greater than a delay between a digital interface base station and the radio unit. The embodiment of method 220 shown in FIG. 2B may be implemented using the DASs 100, 200 described herein; however, method 220 may be performed in other DAS implementations. For pedagogical purposes, method 220 is described with respect to the DAS 200 illustrated in FIG. 2A.

The blocks of the flow diagram shown in FIG. 2B have been arranged in a generally sequential manner for ease of explanation; however, it is to be understood that this arrangement is merely exemplary, and it should be recognized that the processing associated with method 220 (and the blocks shown in FIG. 2B) can occur in a different order (for example, where at least some of the processing associated with the blocks is performed in parallel and/or in an event-driven manner). Also, most standard exception handling is not described for ease of explanation; however, it is to be understood that method 220 can and typically would include such exception handling. Moreover, one or more aspects of method 220 can be configurable or adaptive (either manually or in an automated manner).

In block 220A, a first propagation time delay ($t_{DAS1}$) 200F-1 and $t_{DAS2}$ are obtained by the DAS 200, e.g., the optional processing system 200G. Optionally, $t_{DAS1}$ and $t_{DAS2}$ have each been previously determined after DAS 200 deployment, e.g., using loopback messaging as described elsewhere herein. Optionally, such parameters are stored in the DAS 100, 200, e.g., optional processing system 200G of the DAS 200.

In block 220B, at least one of $t_{NRFD}$ 200A-1 and $t_{RFD}$ 200A-2 are obtained by the DAS 200, e.g., by the optional processing system 200G; optionally, only $t_{RFD}$ 200A-2 is obtained by the DAS 100, 200, e.g., by the optional processing system 200G. Optionally, one or both of $t_{NRFD}$ 200A-1 and $t_{NRFD}$ 200A-2 have been previously characterized, e.g., prior to DAS installation. Optionally, one or both of such parameters are stored in the optional processing system 200G of the DAS 200.

In optional block 220C, $t_{ONRF}$ and $t_{ORF}$ is determined or obtained by the DAS 100, 200, e.g., by the optional processing system 200G. These parameters may be determined using the techniques described elsewhere herein.

With respect to determining or obtaining $t_{ONRF}$ and $t_{ORF}$, optionally, the following technique may be used. In the digital donor interface circuit, when a radio frame of downlink digital data commences is determined. In the RF donor interface circuit, when a radio frame commences in downlink analog RF signals is determined. Using the time base, a first start time for the radio frame of downlink digital data and a second start time for the radio frame in the downlink analog RF signals are determined. Further, determination of the first downlink time delay comprises using a difference between the first start time and the second start time to determine the first downlink time delay.

In block 220D, the first downlink time delay is determined, where the first downlink time delay is equal to (i) a largest propagation delay (a) between the radio unit and through the digital donor interface circuit or (b) between the radio unit and through the RF donor interface circuit, less (i) a shortest propagation time delay (x) between the radio unit and through the digital donor interface circuit or (y) between the radio unit and through the RF donor interface circuit.

Optionally, at least one of: the second downlink time delay and the third downlink time delay are determined; thus, e.g., both the second and the third downlink time delay are determined. Each of the first, the second, and the third downlink time delays are further described elsewhere herein. Optionally, if $t_{DLNRF}$ 223A equals $t_{DLRF}$ 223B, then the first downlink time delay is zero. Optionally, if $t_{RFD}$ 200A-2 plus $t_{DAS2}$ 200F-2 equals $t_{DAS1}$ 200F-1, then the first downlink time delay is zero. The delay adjustment unit, if it exists, which does not store the first downlink time delay is configured to be set to zero. Exemplary embodiments of block 200B-4 are described below.

In a first embodiment of block 220D, determination of the first downlink time delay comprises determining the first downlink time delay when the radio frames of the digital downlink data received from the digital interface base station has been advanced, by the digital interface base station in time by a digital downlink propagation time delay between the digital interface base station and the radio unit.

In a second embodiment of block 220D, the digital interface base station 229 does not advance transmission of a start time of a radio frame of data equal. Delay compensation is performed solely by increasing the first downlink time delay in one downlink path in a delay adjustment unit, e.g., in the radio unit, in the downlink path from the digital donor unit 200A when $t_{DLNRF}$ 223A<$t_{DLRF}$ 223B or in the delay adjustment unit in a downlink path from the RF donor unit 214 when $t_{DLNRF}$ 223A>$t_{DLRF}$ 223B.

In a third embodiment of block 220D, the RF-interface base station 216 advances transmission of a start time of a radio frame of data equal to $t_{DASk}$ which is a constant delay value, e.g., about equal to $t_{DLRF}$ 223B (e.g., a few microseconds less than $t_{DLRF}$ 223B). The constant delay value is added to an RF downlink propagation time delay stored in the second downlink antenna delay. Thus, a start time of a radio frame at the second input 206C of the radio unit 206 has substantially no delay since the radio frame has been advanced by the RF-interface base station to compensate for the total delay from the RF interface base station antenna connector to the output (or antenna port) 206D of the radio unit 206. A first downlink time delay is determined that will increase delay in the radio unit 206 (i.e., in the first delay adjustment unit 206A) in a downlink path through the DAS 200 to the radio unit 206 from the digital interface base station 229 to compensate for delay in the downlink path through the DAS to the radio unit 206 from the RF-interface base station 216.

In a fourth embodiment of block 220D, the start time $t_{0NRF}$ for a radio frame in the digital donor 200A) and a TDD start time $t_{0RF}$ (in the RF donor unit 214) contemporaneous with the radio frame in the digital donor unit 200A can be determined by the DAS 200, e.g., the optional processing system 200G. This embodiment does not utilize the following time delays: $t_{NRFD}$ 200A-1, and $t_{RFD}$ 200A-2. When $(t_{DAS2}-t_{DAS1})-(t_{0NRF}-t_{0RF})$ is greater than zero, then the first downlink time delay=$(t_{DAS2}-t_{DAS1})-(t_{0NRF}-t_{0RF})$ that is configured to be stored, e.g., in the first delay adjustment unit 206A, in the radio unit 206 in a downlink path from the digital donor unit 200A to the radio unit 206. When $(t_{DAS2}-t_{DAS1})-(t_{0NRF}-t_{0RF})$ is less than zero, then the first downlink time delay=$-(t_{DAS2}-t_{DAS1})+(t_{0NRF}-t_{0RF})$ that is configured to be stored, e.g., in the second delay adjustment unit 206F, in the radio unit 206 in a downlink path from the RF donor unit 214 to the radio unit 206.

In optional block 220E (e.g., corresponding to the first embodiment of block 220D), a first uplink time delay is determined, e.g., in a manner described elsewhere herein. Optionally, the first uplink time delay is a roundtrip time delay between an antenna port of the digital interface base station and an antenna port of the radio unit divided by two plus an optional adjustment time period; alternatively, the first uplink time delay is the roundtrip delay between the digital donor and an antenna port of the radio unit 206 less the first downlink time delay. The first uplink time delay is configured to be stored in the digital interface base station 229 and is configured to be used by the digital interface base station to determine a time of arrival of the uplink data delayed by the first uplink time delay. Optionally, a second uplink time delay is determined, e.g., in a manner described elsewhere herein. Exemplary embodiments of block 200E are described below.

In block 200F, each determined DL time delay is transmitted to a corresponding component. The first DL time delay is transmitted to a delay adjustment unit 206A, 206F, e.g., in the radio unit 206, in a downlink path having the shortest propagation time delay (p) through the radio unit and through the digital donor interface circuit or (q) through the radio unit 206 and through the RF donor interface circuit, wherein the delay adjustment circuit is configured to delay TDD downlink data in the downlink path by the first downlink time delay.

Optionally, each delay adjustment unit 206A, 206F is initially set to a zero delay prior to performing block 220F. Optionally, no first downlink time delay is transmitted to a delay adjustment unit 206A, 206F having the longest delay and to which the first downlink time delay is not sent.

If the second DL time delay is determined, then the second DL time delay is transmitted to the digital interface base station 229 and is configured to be stored in the NRF DL antenna delay 229A therein. If the third DL time delay is determined, then the third DL time delay is transmitted to the RF-interface base station 216 and is configured to be stored in the NRF DL delay 229A therein.

The first delay adjustment unit 206A is configured to delay, by the first downlink time delay, transmission in the RU of radio frames of downlink digital data transmitted from the digital interface base station. The NRF DL antenna delay 229A is configured to be used to advance in time transmission of radio frames of digital baseband downlink data from the digital interface base station 229 to the DAS 100, 200, e.g., the digital donor unit 200A, by the NRF DL antenna delay 229A; if no second DL time delay is determined and then transmitted to the digital interface base station 229, then the default value of the NRF DL antenna delay 229A is zero. The RF DL antenna delay 216A is configured to advance in time transmission of radio frames of analog RF signals from the RF-interface base station 216 to the DAS 100, 200, e.g., the RF donor unit 214, by the RF DL antenna delay 216A; if no third DL time delay is determined and then transmitted to the RF-interface base station 216, then the default value of RF DL antenna delay 216A a default value described elsewhere here.

In optional block 220G, each determined UL time delay is transmitted to a corresponding base station. The first UL time delay is transmitted to the digital interface base station 229 and is configured to be stored in the NRF UL antenna delay 229B therein. The first UL time delay is configured to be used by the digital interface base station to determine time of arrival of the uplink data delayed by the first uplink time delay. If the second UL time delay is determined, then the second UL time delay is transmitted to the RF-interface base station 216 and is configured to be stored in the RF UL antenna delay 216B therein. The second UL time delay is configured to be stored in the RF-interface base station and to be used by the RF-interface base station to determine time of arrival of the uplink data delayed by the second uplink time delay. If no second UL time delay is determined and then transmitted to the RF-interface base station 216, then the default value of RF UL antenna delay 216A a default value described elsewhere here.

The processor(s), e.g., processor circuitry, described herein may include one or more microprocessors, micro-controllers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory, e.g., memory circuitry, described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

EXEMPLARY EMBODIMENTS

Example 1 includes a distributed antenna system (DAS) serving a digital interface base station and a radio frequency (RF)-interface base station and configured to time align contemporaneous time division duplexing (TDD) frames from the digital interface base station and the RF-interface base station in a radio unit, the distributed antenna system comprising: a digital donor interface circuit configured to couple the digital interface base station to the DAS and to communicate digital data in radio frames between the digital interface base station and the DAS; an RF donor interface circuit configured to couple the RF-interface base station to the DAS and to communicate data in radio frames in analog radio frequency (RF) signals between the RF-interface base station and the RF donor interface circuit; a first DAS propagation path; a second DAS propagation path; and the radio unit communicatively coupled to the digital donor interface circuit through the first DAS propagation path and communicatively coupled to the RF donor interface circuit through the second DAS propagation path, wherein the radio unit is configured to be coupled to a set of coverage antennas; wherein the DAS is configured to: obtain a first propagation time delay for the first DAS propagation path and a second propagation time delay for the second DAS propagation path; obtain at least one of a time delay of the RF donor interface circuit and the digital donor interface circuit; determine a first downlink time delay value equal to (i) a largest propagation delay (a) between an antenna port of the radio unit and through the digital donor interface circuit or (b) between the antenna port of the radio unit and through the RF donor interface circuit, less (i) a shortest propagation time delay (x) between the antenna port of the radio unit and through the digital donor interface circuit or (y) between the antenna port of the radio unit and through the RF donor interface circuit; and transmit the first downlink time delay value to a delay adjustment circuit in a downlink path of the DAS having the shortest propagation time delay (p) between the antenna port of the radio unit and through the digital donor interface circuit or (q) between the antenna port of the radio unit and through the RF donor interface circuit, wherein the delay adjustment circuit is configured to delay TDD downlink data in the downlink path by the first downlink time delay value.

Example 2 includes the DAS of Example 1, further comprising time base circuitry configured to generate a time base; wherein the DAS is further configured to: determine, in the digital donor interface circuit, when a radio frame of downlink digital data commenced; determine, in the RF donor interface circuit, when a radio frame commenced in downlink analog RF signals contemporaneous with the radio frame of downlink digital data; and using the time base, determining a first start time for the radio frame of downlink digital data and a second start time for the radio frame in the downlink analog RF signals; wherein determining the first downlink time delay value comprises using a difference between the first start time and the second start time, determine the first downlink time delay value.

Example 3 includes the DAS of any of Examples 1-2, wherein determining the first downlink time delay value comprises determine the first downlink time delay value by which the radio frames of downlink digital data received from the digital interface base station have been advanced, by the digital interface base station in time by a digital downlink propagation time delay between the digital interface base station and the antenna port of the radio unit; wherein the DAS is further configured to: determine a first uplink time delay value; and transmit the first uplink time delay value to the digital interface base station and which is configured to be stored in the digital interface base station and to be used by the digital interface base station to determine a time of arrival of uplink data delayed by the first uplink time delay value.

Example 4 includes the DAS of any of Examples 1-3, wherein the DAS is further configured to: provide, to the RF-interface base station, a constant delay value configured to be added to an RF downlink propagation time delay value stored in a second downlink antenna delay, wherein the radio frames of data in downlink analog RF signals received by the DAS from the RF-interface base station are advanced, by the RF-interface base station, in time by the RF downlink propagation time delay value, and wherein a time delay value stored in a second uplink antenna delay is configured to be used by the RF-interface base station to determine a time of arrival of uplink data; and transmit the constant delay value to the digital interface base station which is configured to increase the first downlink time delay value by the constant delay value.

Example 5 includes the DAS of any of Examples 1-4, wherein determining the first downlink time delay value comprises determine the first downlink time delay value when downlink digital data received from the digital inter-face base station has not been advanced in time by the digital interface base station.

Example 6 includes the DAS of any of Examples 1-5, wherein the radio unit comprises a first delay adjustment circuit in a downlink path from the digital donor interface circuit and a second delay adjustment circuit in a downlink path from the RF donor interface circuit; wherein the delay adjustment circuit is one of the first and the second delay adjustment circuits.

Example 7 includes the DAS of any of Examples 1-6, wherein the DAS comprises the delay adjustment circuit.

Example 8 includes a method for time aligning, in a distributed antenna system (DAS), contemporaneous time division duplexing (TDD) frames from a digital interface base station and a radio frequency (RF)-interface base station in the DAS, the method comprising: obtaining a first propagation time delay for a first DAS propagation path and a second propagation time delay for a second DAS propa-gation path; obtaining at least one of a time delay of an RF donor unit and a digital donor unit; determining a first downlink time delay value equal to (i) a largest propagation delay (a) between an antenna port of a radio unit and through the digital donor unit or (b) between the antenna port of the radio unit and through the RF donor unit, less (i) a shortest propagation time delay (x) between the antenna port of the radio unit and through the digital donor unit or (y) between the antenna port of the radio unit and through the RF donor unit; and transmitting the first downlink time delay value to a delay adjustment circuit in a downlink path of the DAS having the shortest propagation time delay (p) between the antenna port of the radio unit and through the digital donor unit or (q) between the antenna port of the radio unit and through the RF donor unit, wherein the delay adjustment circuit is configured to delay TDD downlink data in the downlink path by the first downlink time delay value.

Example 9 includes the method of Example 8, further comprising: determining, in the digital donor unit, when a radio frame of downlink digital data commenced; determin-ing, in the RF donor unit, when a radio frame commenced in downlink analog RF signals contemporaneous with the radio frame of downlink digital data; and using a time base generated, determining a first start time for the radio frame of downlink digital data and a second start time for the radio frame in the downlink analog RF signals; wherein deter-mining the first downlink time delay value comprises using a difference between the first start time and the second start time, determining the first downlink time delay value.

Example 10 includes the method of any of Examples 8-9, further comprising: determining a first uplink time delay value; and transmitting the first uplink time delay value to the digital interface base station and which is configured to be stored in the digital interface base station and to be used by the digital interface base station to determine a time of arrival of uplink data delayed by the first uplink time delay value; wherein determining the first downlink time delay value comprises determine the first downlink time delay value by which radio frames of downlink digital data received from the digital interface base station have been advanced, by the digital interface base station in time by a digital downlink propagation time delay between the digital interface base station and the antenna port of the radio unit.

Example 11 includes the method of any of Examples 8-10, further comprising: providing, to the RF-interface base station, a constant delay value configured to be added to an RF downlink propagation time delay value stored in a second downlink antenna delay, wherein radio frames of data in downlink analog RF signals received by the DAS from the RF-interface base station are advanced, by the RF-interface base station, in time by the RF downlink propagation time delay value, and wherein a time delay value stored in a second uplink antenna delay is configured to be used by the RF-interface base station to determine a time of arrival of uplink data; and transmitting the constant delay value to the digital interface base station which is configured to increase the first downlink time delay value by the constant delay value.

Example 12 includes the method of any of Examples 8-11, wherein determining the first downlink time delay value comprises determining the first downlink time delay value when digital downlink data received from the digital interface base station has not been advanced in time by the digital interface base station.

Example 13 includes a non-transitory computer readable medium storing a program causing at least one processor to execute a process to time align, in a distributed antenna system (DAS), contemporaneous time division duplexing (TDD) frames from a digital interface base station and a radio frequency (RF)-interface base station in the DAS, the process comprising: obtaining a first propagation time delay for a first DAS propagation path and a second propagation time delay for a second DAS propagation path; obtaining at least one of a time delay of a RF donor unit and a digital donor unit; determining a first downlink time delay value equal to (i) a largest propagation delay (a) between an antenna port of a radio unit and through the digital donor unit or (b) between the antenna port of the radio unit and through the RF donor unit, less (i) a shortest propagation time delay (x) between the antenna port of the radio unit and through the digital donor unit or (y) between the antenna port of the radio unit and through the RF donor unit; and causing transmission of the first downlink time delay value to a delay adjustment circuit in a downlink path of the DAS having the shortest propagation time delay (p) between the antenna port of the radio unit and through the digital donor unit or (q) between the antenna port of the radio unit and through the RF donor unit, wherein the delay adjustment circuit is configured to delay TDD downlink data in the downlink path by the first downlink time delay value.

Example 14 includes the non-transitory computer read-able medium of Example 13, wherein the process further comprises: determining, in the digital donor unit, when a radio frame of downlink digital data commenced; determining, in the RF donor unit, when a radio frame commences in downlink analog RF signals contemporaneous with the radio frame of downlink digital data; and using a time base generated, determining a first start time for the radio frame of downlink digital data and a second start time for the radio frame in the downlink analog RF signals; wherein determining the first downlink time delay value comprises using a difference between the first start time and the second start time, determining the first downlink time delay value.

Example 15 includes the non-transitory computer readable medium of any of Examples 13-14, wherein the process further comprises: determining a first uplink time delay value; and causing transmission of the first uplink time delay value to the digital interface base station and which is configured to be stored in the digital interface base station and to be used by the digital interface base station to determine a time of arrival of uplink data delayed by the first uplink time delay value; wherein determining the first downlink time delay value comprises determining the first downlink time delay value when radio frames of downlink digital data received from the digital interface base station has been advanced, by the digital interface base station, in time by a digital downlink propagation time delay between the digital interface base station and the antenna port of the radio unit.

Example 16 includes the non-transitory computer readable medium of any of Examples 13-15, wherein the process further comprises: providing, to the RF-interface base station, a constant delay value configured to be added to an RF downlink propagation time delay value stored in a second downlink antenna delay, wherein radio frames of data in downlink analog RF signals received by the DAS from the RF-interface base station are advanced, by the RF-interface base station, in time by the RF downlink propagation time delay value, and wherein a time delay value stored in a second uplink antenna delay is configured to be used by the RF-interface base station to determine a time of arrival of uplink data; and transmitting the constant delay value to the digital interface base station which is configured to increase the first downlink time delay value by the constant delay value.

Example 17 includes the non-transitory computer readable medium of any of Examples 13-16, wherein determining the first downlink time delay value comprises determining the first downlink time delay value when a digital downlink data received from the digital interface base station has not been advanced in time by the digital interface base station.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A distributed antenna system (DAS) serving a digital interface base station and a radio frequency (RF)-interface base station and configured to time align contemporaneous time division duplexing (TDD) radio frames from the digital interface base station and the RF-interface base station in a radio unit, the DAS comprising:
a digital donor interface circuit configured to couple the digital interface base station to the DAS and to communicate digital data for radio frames between the digital interface base station and the DAS;
an RF donor interface circuit configured to couple the RF-interface base station to the DAS and to communicate data in radio frames in analog radio frequency (RF) signals between the RF-interface base station and the RF donor interface circuit;
a first DAS propagation path;
a second DAS propagation path; and
the radio unit communicatively coupled to the digital donor interface circuit through the first DAS propagation path and communicatively coupled to the RF donor interface circuit through the second DAS propagation path, wherein the radio unit is configured to be coupled to a set of coverage antennas;
wherein the DAS is configured to:
obtain a first propagation time delay for the first DAS propagation path and a second propagation time delay for the second DAS propagation path;
obtain at least one of a time delay of the RF donor interface circuit and the digital donor interface circuit;
determine a first downlink time delay value equal to (i) a largest propagation delay (a) from an antenna port of the radio unit through the digital donor interface circuit or (b) from the antenna port of the radio unit through the RF donor interface circuit, minus (i) a shortest propagation time delay (x) from the antenna port of the radio unit through the digital donor interface circuit or (y) from the antenna port of the radio unit through the RF donor interface circuit; and
transmit the first downlink time delay value to a delay adjustment circuit in a downlink path of the DAS having the shortest propagation time delay (p) from the antenna port of the radio unit through the digital donor interface circuit or (q) from the antenna port of the radio unit through the RF donor interface circuit, wherein the delay adjustment circuit is configured to delay TDD downlink data in the downlink path by the first downlink time delay value.

2. The DAS of claim 1, further comprising time base circuitry configured to generate a time base;
wherein the DAS is further configured to:
determine an occurrence of when downlink digital data for a radio frame commences in the digital donor interface circuit;
determine an occurrence of when a radio frame commenced in downlink analog RF signals, contemporaneous with the downlink digital data, in the RF donor interface circuit; and
using the time base, determine a first start time for the downlink digital data and a second start time for the radio frame in the downlink analog RF signals;
wherein the determined first downlink time delay value is determined using a difference between the first start time and the second start time.

3. The DAS of claim 1, wherein the determined first downlink time delay value is a first downlink time delay value by which downlink digital data received from the digital interface base station have been advanced, by the digital interface base station in time by a digital downlink propagation time delay between the digital interface base station and the antenna port of the radio unit; and
wherein the DAS is further configured to:
determine a first uplink time delay value; and
transmit the first uplink time delay value to the digital interface base station and which is configured to be stored in the digital interface base station and to be used by the digital interface base station to determine a time of arrival of uplink data delayed by the first uplink time delay value.

4. The DAS of claim 1, wherein the DAS is further configured to:

provide, to the RF-interface base station, a constant delay value configured to be added to an RF downlink propagation time delay value stored in a second downlink antenna delay, wherein radio frames of data in downlink analog RF signals received by the DAS from the RF-interface base station are advanced, by the RF-interface base station, in time by the RF downlink propagation time delay value, and wherein a time delay value stored in a second uplink antenna delay is configured to be used by the RF-interface base station to determine a time of arrival of uplink data; and transmit the constant delay value to the digital interface base station to increase the first downlink time delay value by the constant delay value.

5. The DAS of claim 1, wherein the determined first downlink time delay is a first downlink time delay value when downlink digital data received from the digital interface base station has not been advanced in time by the digital interface base station.

6. The DAS of claim 1, wherein the radio unit comprises a first delay adjustment circuit in a downlink path from the digital donor interface circuit and a second delay adjustment circuit in a downlink path from the RF donor interface circuit;

wherein the delay adjustment circuit is one of the first and the second delay adjustment circuits.

7. The DAS of claim 1, wherein the DAS comprises the delay adjustment circuit.

8. A method for time aligning, in a distributed antenna system (DAS), contemporaneous time division duplexing (TDD) radio frames from a digital interface base station and a radio frequency (RF)-interface base station in the DAS, the method comprising:

obtaining a first propagation time delay for a first DAS propagation path and a second propagation time delay for a second DAS propagation path;

obtaining at least one of a time delay of an RF donor unit and a digital donor unit;

determining a first downlink time delay value equal to (i) a largest propagation delay (a) from an antenna port of a radio unit through the digital donor unit or (b) from the antenna port of the radio unit through the RF donor unit, minus (i) a shortest propagation time delay (x) from the antenna port of the radio unit through the digital donor unit or (y) from the antenna port of the radio unit through the RF donor unit; and transmitting the first downlink time delay value to a delay adjustment circuit in a downlink path of the DAS having the shortest propagation time delay (p) between the antenna port of the radio unit and through the digital donor unit or (q) between the antenna port of the radio unit and through the RF donor unit, wherein the delay adjustment circuit is configured to delay TDD downlink data in the downlink path by the first downlink time delay value.

9. The method of claim 8, further comprising:

determining an occurrence of when downlink digital data for a radio frame commenced in the digital donor unit;

determining an occurrence of when a radio frame commenced in downlink analog RF signals, contemporaneous with the downlink digital data in the RF donor unit; and using a time base generated, determining a first start time for the downlink digital data and a second start time for the radio frame in the downlink analog RF signals;

wherein the determined first downlink time delay value is determined using a difference between the first start time and the second start time.

10. The method of claim 8, further comprising:

determining a first uplink time delay value; and transmitting the first uplink time delay value to the digital interface base station and which is configured to be stored in the digital interface base station and to be used by the digital interface base station to determine a time of arrival of uplink data delayed by the first uplink time delay value;

wherein the determined first downlink time delay value is a first downlink time delay value by which downlink digital data received from the digital interface base station have been advanced, by the digital interface base station in time by a digital downlink propagation time delay between the digital interface base station and the antenna port of the radio unit.

11. The method of claim 8, further comprising:

providing, to the RF-interface base station, a constant delay value configured to be added to an RF downlink propagation time delay value stored in a second downlink antenna delay, wherein radio frames of data in downlink analog RF signals received by the DAS from the RF-interface base station are advanced, by the RF-interface base station, in time by the RF downlink propagation time delay value, and wherein a time delay value stored in a second uplink antenna delay is configured to be used by the RF-interface base station to determine a time of arrival of uplink data; and transmitting the constant delay value to the digital interface base station to increase the first downlink time delay value by the constant delay value.

12. The method of claim 8, wherein the determined first downlink time delay value is a first downlink time delay value when digital downlink data received from the digital interface base station has not been advanced in time by the digital interface base station.

13. A non-transitory computer readable medium storing a program causing at least one processor to execute a process to time align, in a distributed antenna system (DAS), contemporaneous time division duplexing (TDD) radio frames from a digital interface base station and a radio frequency (RF)-interface base station in the DAS, the process comprising:

obtaining a first propagation time delay for a first DAS propagation path and a second propagation time delay for a second DAS propagation path;

obtaining at least one of a time delay of a RF donor unit and a digital donor unit;

determining a first downlink time delay value equal to (i) a largest propagation delay (a) from an antenna port of a radio unit through the digital donor unit or (b) from the antenna port of the radio unit through the RF donor unit, minus (i) a shortest propagation time delay (x) from the antenna port of the radio unit through the digital donor unit or (y) from the antenna port of the radio unit through the RF donor unit; and causing transmission of the first downlink time delay value to a delay adjustment circuit in a downlink path of the DAS having the shortest propagation time delay (p) from the antenna port of the radio unit through the digital donor unit or (q) from the antenna port of the radio unit through the RF donor unit, wherein the delay adjustment circuit is configured to delay TDD downlink data in the downlink path by the first downlink time delay value.

14. The non-transitory computer readable medium of claim 13, wherein the process further comprises:

determining an occurrence of when downlink digital data for a radio frame commenced in the digital donor unit;

determining an occurrence of when a radio frame commenced in downlink analog RF signals, contemporaneous with the downlink digital data, in the RF donor unit; and using a time base generated, determining a first start time for the downlink digital data and a second start time for the radio frame in the downlink analog RF signals;

wherein the determined first downlink time delay value is determined using a difference between the first start time and the second start time.

15. The non-transitory computer readable medium of claim 13, wherein the process further comprises:

determining a first uplink time delay value; and causing transmission of the first uplink time delay value to the digital interface base station and which is configured to be stored in the digital interface base station and to be used by the digital interface base station to determine a time of arrival of uplink data delayed by the first uplink time delay value;

wherein the determined first downlink time delay value is a first downlink time delay value when downlink digital data received from the digital interface base station has been advanced, by the digital interface base station, in time by a digital downlink propagation time delay between the digital interface base station and the antenna port of the radio unit.

16. The non-transitory computer readable medium of claim 13, wherein the process further comprises:

providing, to the RF-interface base station, a constant delay value configured to be added to an RF downlink propagation time delay value stored in a second downlink antenna delay, wherein radio frames of data in downlink analog RF signals received by the DAS from the RF-interface base station are advanced, by the RF-interface base station, in time by the RF downlink propagation time delay value, and wherein a time delay value stored in a second uplink antenna delay is configured to be used by the RF-interface base station to determine a time of arrival of uplink data; and transmitting the constant delay value to the digital interface base station to increase the first downlink time delay value by the constant delay value.

17. The non-transitory computer readable medium of claim 13, wherein the determined first downlink time delay value is a first downlink time delay value when a digital downlink data received from the digital interface base station has not been advanced in time by the digital interface base station.

* * * * *